United States Patent [19]
Davis et al.

[11] Patent Number: 5,870,545
[45] Date of Patent: Feb. 9, 1999

[54] SYSTEM AND METHOD FOR PERFORMING FLEXIBLE WORKFLOW PROCESS COMPENSATION IN A DISTRIBUTED WORKFLOW MANAGEMENT SYSTEM

[75] Inventors: James W. Davis, Sunnyvale; Weimin Du, San Jose; Ming-Chien Shan, Saratoga, all of Calif.

[73] Assignee: Hewlett-Packard Company, Palo Alto, Calif.

[21] Appl. No.: 825,853

[22] Filed: Apr. 4, 1997

Related U.S. Application Data

[60] Provisional application No. 60/032,567, Dec. 5, 1996.

[51] Int. Cl.$^6$ .......................................... G06F 9/00

[52] U.S. Cl. .......................................... 395/200.31

[58] Field of Search .................... 364/DIG. 1, DIG. 2; 395/180, 181, 182.01, 182.02, 182.03, 182.1, 183.2, 184.01, 200.3, 200.31–200.51, 670, 675; 707/103

[56] References Cited

U.S. PATENT DOCUMENTS

| | | | |
|---|---|---|---|
| 5,634,127 | 5/1997 | Cloud et al. | 395/680 |
| 5,745,901 | 4/1998 | Entner et al. | 707/103 |

*Primary Examiner*—Robert B. Harrell

[57] ABSTRACT

A system and method for performing flexible workflow process compensation in a distributed workflow management system is described. A computer network includes a plurality of interconnected computers. Each computer includes a processor, memory and input/output facilities. The distributed workflow management system operates over the computer network. A plurality of resources perform the workflow process is performed with each resource operatively coupled to at least one of the computers. A process definition diagram includes computer-readable instructions stored in the memory of at least one of the computers and contains a role specification of process activities for performing the workflow process. A resource manager maps the role specification of process activities to at least one of the resources at runtime. A workflow process engine executes each process activity using the mapped resource and compensates a failed process activity responsive to the process definition diagram.

33 Claims, 16 Drawing Sheets

SYSTEM AND METHOD FOR PERFORMING FLEXIBLE WORKFLOW PROCESS COMPENSATION IN A DISTRIBUTED WORKFLOW MANAGEMENT SYSTEM

CROSS-REFERENCE TO RELATED APPLICATION

This patent application is a continuation application of provisional application Ser. No. 60/032,567, filed on Dec. 5, 1996, by Weimin Du et. al., and entitled WORKFLOW/PROCESS FLOW PROCESS MANAGEMENT SYSTEM, the disclosure of which is incorporated herein by reference.

This patent application is related to a commonly-assigned patent application entitled SYSTEM AND METHOD FOR PERFORMING FLEXIBLE WORKFLOW PROCESS EXECUTION IN A DISTRIBUTED WORKFLOW MANAGEMENT SYSTEM, Ser. No. 08/821940, filed on Mar. 21, 1997, the disclosure of which is incorporated herein by reference.

This patent application is also related to a commonly-assigned patent application entitled SYSTEM AND METHOD FOR PERFORMING SCALABLE DISTRIBUTION OF PROCESS FLOW ACTIVITIES IN A DISTRIBUTED WORKFLOW MANAGEMENT SYSTEM, Ser. No. 08/828208, filed on Mar. 21, 1997, the disclosure of which is incorporated herein by reference.

This patent application is related to a commonly-assigned patent application entitled DISTRIBUTED WORKFLOW RESOURCE MANAGEMENT SYSTEM AND METHOD, Ser. No. 08/768261, now U.S. Pat. No. 5,826,239, filed on Dec. 17, 1996, the disclosure of which is incorporated herein by reference.

BACKGROUND OF THE INVENTION

This invention relates to the field of workflow process management and more particularly to a system and method for performing flexible workflow process compensation in a distributed workflow management system.

Workflow process re-engineering, that is, the fundamental rethinking and re-implementation of workflow processes to achieve never-before-possible levels of quality, cost, throughput and service, is emerging as one of the crucial business strategies of the 1990s. The need for re-engineering is especially significant in an era of workforce downsizing coupled with greater demands for shortened time to market and faster customer response. Moreover, the need is pervasive. Organizations are currently engaging in workflow process re-engineering in many domains, including financial services, telecommunications services, healthcare services, customer order fulfillment, manufacturing procedure automation and electronic commerce.

While workflow process re-engineering provides a business management concept, workflow process management (WFPM) software-or more accurately, middleware-provides the enabling technologies for actually performing workflow process re-engineering. WFPM supports flexible solutions for the management of enterprise-wide operations, including workflow process control, automation and monitoring; resource allocation, authorization and authentication; task initialization and data exchange; and end-to-end communication and security. However, while WFPM offers an overall environment and approach to unifying, automating and measuring workflow processes, it is not limited to supporting workflow process re-engineering and can be used to manage existing nonautomated legacy or work processes.

In general, WFPM systems perform a wide range of tasks. For instance, they can provide a method for defining and managing the flow of a work process or support the definition of resources and their attributes. In addition, they can assign resources to work, determine which steps will be executed next within a work process and when they will be executed and can ensure that the workflow process continues until proper termination. Moreover, they can notify resources about pending work, enforce administrative policies, such as access control and track execution and support user inquiries of status. Finally, they can provide history information in the form of an audit trail for completed workflow processes and collect statistical data for process and resource bottleneck analysis, flow optimization and automatic workload balancing.

Moreover, given the trend towards open systems and standards, a WFPM system must coexist with and take advantage of standards-based commercial products for network communication, legacy application invocation and system monitoring. In particular, these standards include the Object Management Group's Common Object Request Broker Architecture (CORBA), the Open Software Foundation's Distributed Computing Environment (OSF DCE), Hewlett Packard's OpenView and the International Standards Organization Open Systems Interconnection (ISO OSI) X.400 technologies.

In a WFPM system, some applications require the selective use of transactional properties for individual tasks or entire workflow processes to meet consistency or reliability requirements of the business. Compensation is a useful way to ensure these transactional properties for workflow processes. Although compensation is also used in database applications, the compensation of workflow processes is very different from compensation of database transactions for the following reasons. First, a workflow process is structurally more complex than a database transaction. For instance, a workflow process usually accesses multiple independent databases and other resources and systems. Additionally, it is difficult to implement a workflow process as a single transactional unit or as a simple sequence of transactional units. As a result, specifying the compensation scope for a workflow process becomes a non-trivial task.

Second, while a database transaction typically consists of a sequence of database read and write operations, a workflow process can include a set of arbitrarily complex process activities that can be expensive to compensate and re-execute. This complexity makes workflow process compensation difficult to perform in terms of specification and implementation.

Third, the purpose of workflow process compensation is quite different than the purpose of database system compensation. Instead of "undoing" previously completed operations, the idea of compensation in workflow systems is to bring the process execution back to a crucial state where the cause of the failure can be identified. Thus, the purpose is to fix or avoid the problem so that the execution can be resumed and successfully complete.

There is a need for a system and method for flexibly and efficiently compensating a structurally complex workflow process. Such a workflow process could consists of an arbitrarily complex sequence of tasks and involve a plurality of databases, resources and systems.

There is a further need for a system and method for compensating a workflow process which can minimize compensation scope and thereby avoid unnecessary compensation efforts to significantly reduce compensation overhead.

There is still a further need for a system and method for compensating a workflow process which provides flexible specification and implementation strategies.

SUMMARY OF THE INVENTION

The present invention provides a system and method for performing flexible workflow process compensation in a distributed workflow management system.

An embodiment of the present invention is a system and method for performing flexible workflow process compensation in a distributed workflow management system. A computer network includes a plurality of interconnected computers. Each computer includes a processor, memory and input/output facilities. The distributed workflow management system operates over the computer network. A plurality of resources perform the workflow process is performed with each resource operatively coupled to at least one of the computers. A process definition diagram includes computer-readable instructions stored in the memory of at least one of the computers and contains a role specification of process activities for performing the workflow process. A resource manager maps the role specification of process activities to at least one of the resources at runtime. A workflow process engine executes each process activity using the mapped resource and compensates a failed process activity responsive to the process definition diagram.

The foregoing and other objects, features and advantages of the invention will become more readily apparent from the following detailed description of a preferred embodiment of the invention which proceeds with reference to the accompanying drawings.

DETAILED DESCRIPTION

Workflow Process Management System

Figure 1:
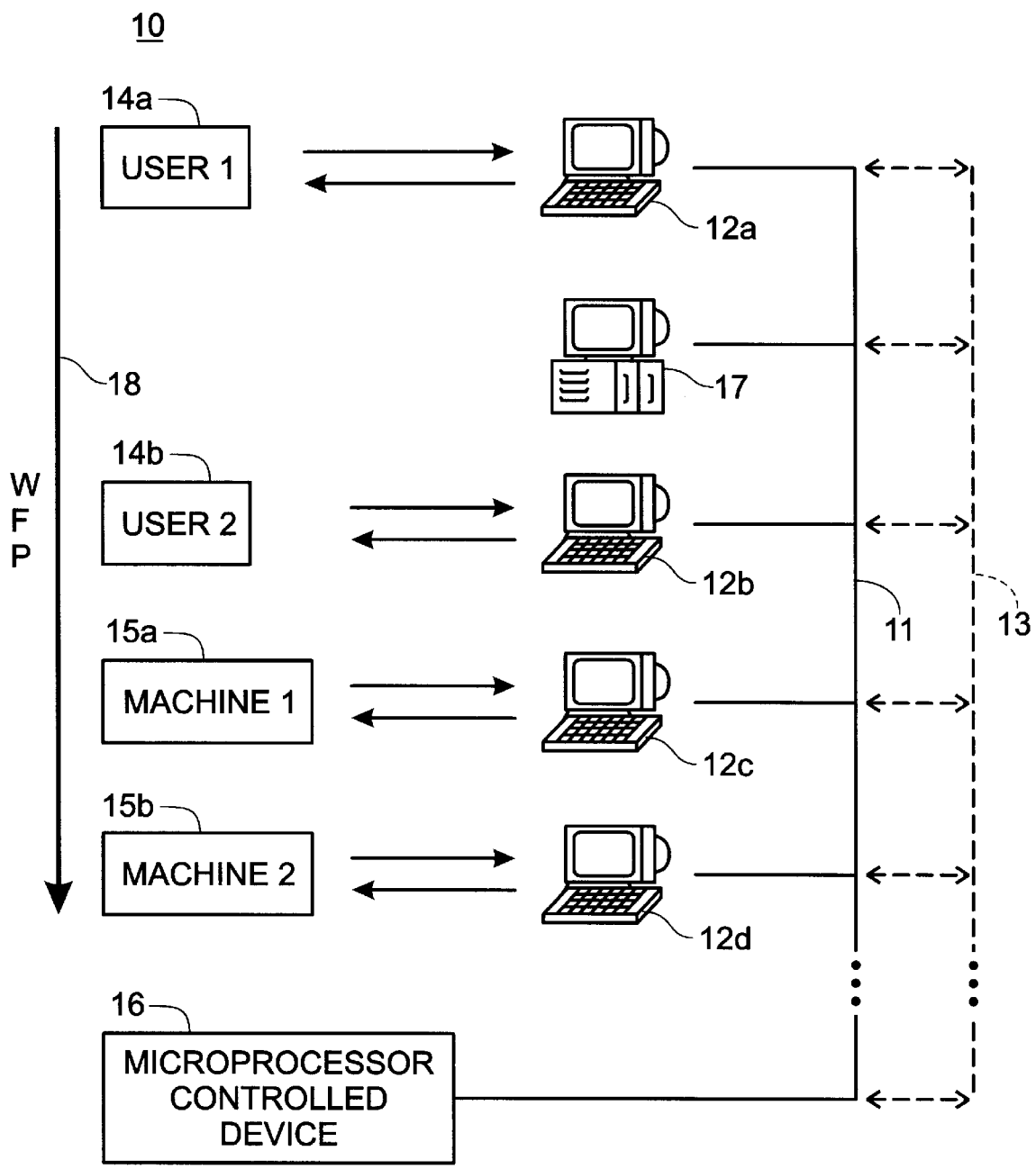
FIG. 1 is a block diagram of a process flow management system implemented in a network of computers coupled to a plurality of users and machines for management and control of workflow process activities performed by the users an machines.

FIG. 1 shows a block diagram of a workflow process management (WFPM) system 10 implemented in a network 11 of computer systems 12a–d coupled to a plurality of users 14a–b and machines 15a–b for management and control of workflow process activities. Each computer system 12a–d is shown coupled with a single user 14a–b or machine 15a–b, but multiple users or machines or combinations thereof can also be employed. The WFPM system 10 is shown from an enterprise perspective with the control and coordination of each of the computer systems 12a–d being accomplished by computer software, preferably object-oriented software, executed as a distributed application by the computer systems 12a–d. Optionally, workflow process activity information, such as resource data and rules, can be stored in a database on a centralized WFPM server 17 which is accessible by the computer systems 12a–d over the network 11 or can be stored in a plurality of databases on each of the computer systems 12a–d. The computer systems 12a–d and centralized WFPM server 17 conventionally include a processor, memory and input/output interface including network communications facilities and user input and output devices.

Each workflow process 18 includes a sequence of activities, each of which is ordinarily performed by one of the computer systems 12a–d in conjunction with an associated user 14a–b or machine 15a–b, although some activities can be performed by microprocessor-controlled devices 16 (one such device shown in FIG. 1, although multiple devices can be used), such as a telephone or facsimile machine, printing device or similar self-controlling mechanism. In addition, each machine 15a–b can be a work instrument or computer resource.

The workflow process 18 can span several business organizations (only one organization is shown in FIG. 1) with multiple activities potentially performed in parallel. In such cases, the WFPM system 10 acts as the "superstructure" that ties together disparate computer systems 12a–d whose business purposes are interconnected. The WFPM system 10 provides procedural automation 13 of the workflow process 18 by managing the sequence of process activities and the invocation of appropriate user 14a–b, machine 15a–b or microprocessor-controlled device 16 resources associated with the various activity steps.

Workflow Process Specification

The procedural automation 13 of the workflow process 18 involves the high-level specification of individual workflows (examples shown in FIG. 3 and FIG. 7) which provides the operational "glue" and environment support needed by the WFPM system 10 for managing and automating the workflow processes 18, recovering from failures and enforcing consistency. As further described hereinbelow, the WFPM system 10 also enforces various administrative policies associated with resources and work.

The specific structure and flow of each workflow process 18 managed by the WFPM system 10 can be preplanned or developed in an ad hoc fashion. For example, in a WFPM system 10 used for managing the workflow process 18 of providing telecommunications services, some aspects of the workflow process 18 are determined ad hoc and depend in part on the services required by each individual customer. However, other aspects of the workflow process 18 can be preplanned and deliberately structured. For instance, independent from the individual services required by a single customer, the workflow process 18 always originates in the sales department and typically ends in the billing department. The parts of the workflow process 18 involving these departments can be preplanned.

HP OpenPM

Figure 2:
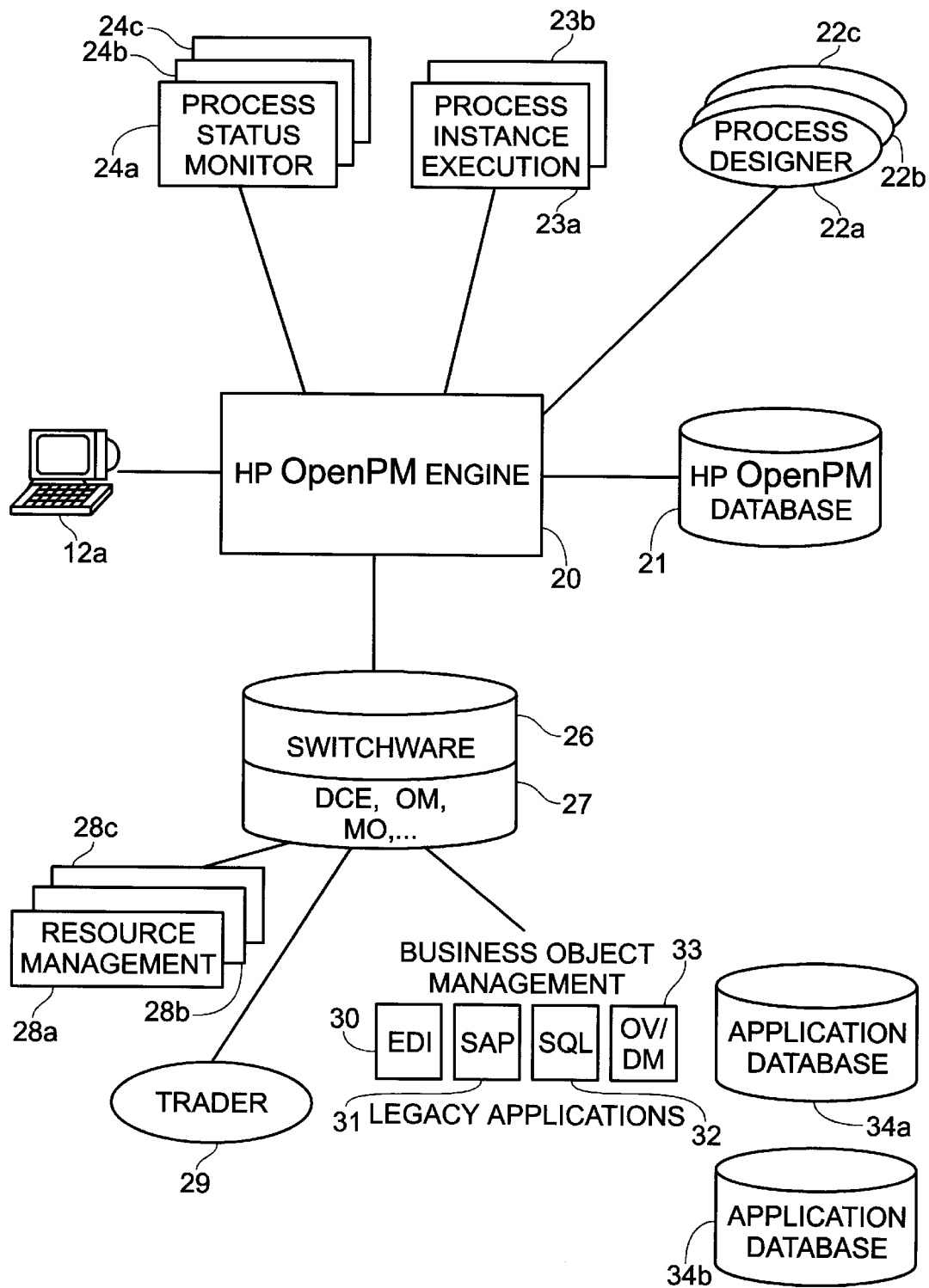
FIG. 2 is a block diagram of a hardware and software machine for a typical node in the network of FIG. 1 showing the architecture of an example of process flow management middleware employing the present invention.

FIG. 2 is a block diagram of a hardware and software machine for a typical node 12a in the network 11 of FIG. 1 showing, by way of example, an architecture for WPFM middleware employing the present invention. An example of middleware suitable for implementing the present invention is the Hewlett Packard (HP) OpenPM system. HP OpenPM is an open, enterprise-capable, object-oriented WFPM system developed at Hewlett Packard Laboratories, Palo Alto, Calif., for managing process activities that support complex enterprise processes in a distributed, heterogeneous computing environment. The use of a WFPM system 10 implemented in middleware represents a substantial evolution over traditional workflow technologies. HP OpenPM provides a generic framework and complete set of services for workflow process management using a middleware-based approach with an emphasis on performance, availability, scalability and system robustness.

Briefly, HP OpenPM provides an open system adhering to the CORBA communications infrastructure with a Workflow Management Coalition-standard interface. Second, it offers high performance as a result of optimized database access and commitment features. It also provides effective management when coupled with an HP OpenView-based system management environment. Finally, HP OpenPM presents a comprehensive solution for business re-engineering, including an extensive set of products.

The overall architecture of the HP OpenPM system is depicted in FIG. 2. The core is the HP OpenPM engine 20, which supports five interfaces. The interfaces enable the HP OpenPM engine 20 to interact with workflow process designer 22a–c, workflow process instance execution 23a–b, workflow process monitor 24a–c, workflow management 28a–c and business object management modules 30, 31, 32, 33. In addition, worldwide web client support is provided by each individual network node 12a which can execute middleware modules expressed in platform-independent languages, such as Java Applets and HTML code. An HP OpenPM database 21 is maintained on the centralized WFPM server 17 (shown in FIG. 1) for use by the HP OpenPM engine 20.

A workflow process 18 is specified by the process design modules 22a–c via the workflow process definition interface. An instance of a workflow process 18 can be started, controlled or stopped by the process instance execution modules 23a–b via the process execution interface. Status information of each process instance and load information for the WFPM system 10 can be queried using the process status monitor modules 24a–c via the process status monitoring interface. The workflow management interface is used to allocate, at run time, execution resources to a task, according to the policies defined by the organization (including authorization and authentication) and the availability of the resources using the workflow management modules 28a–c. Interaction with the external world, such as invoking an application, controlling an instrument or delivering a work order to a person's electronic mail in-box, is performed by the various business object management modules 30, 31, 32, 33.

HP OpenPM Process Model

Figure 3:
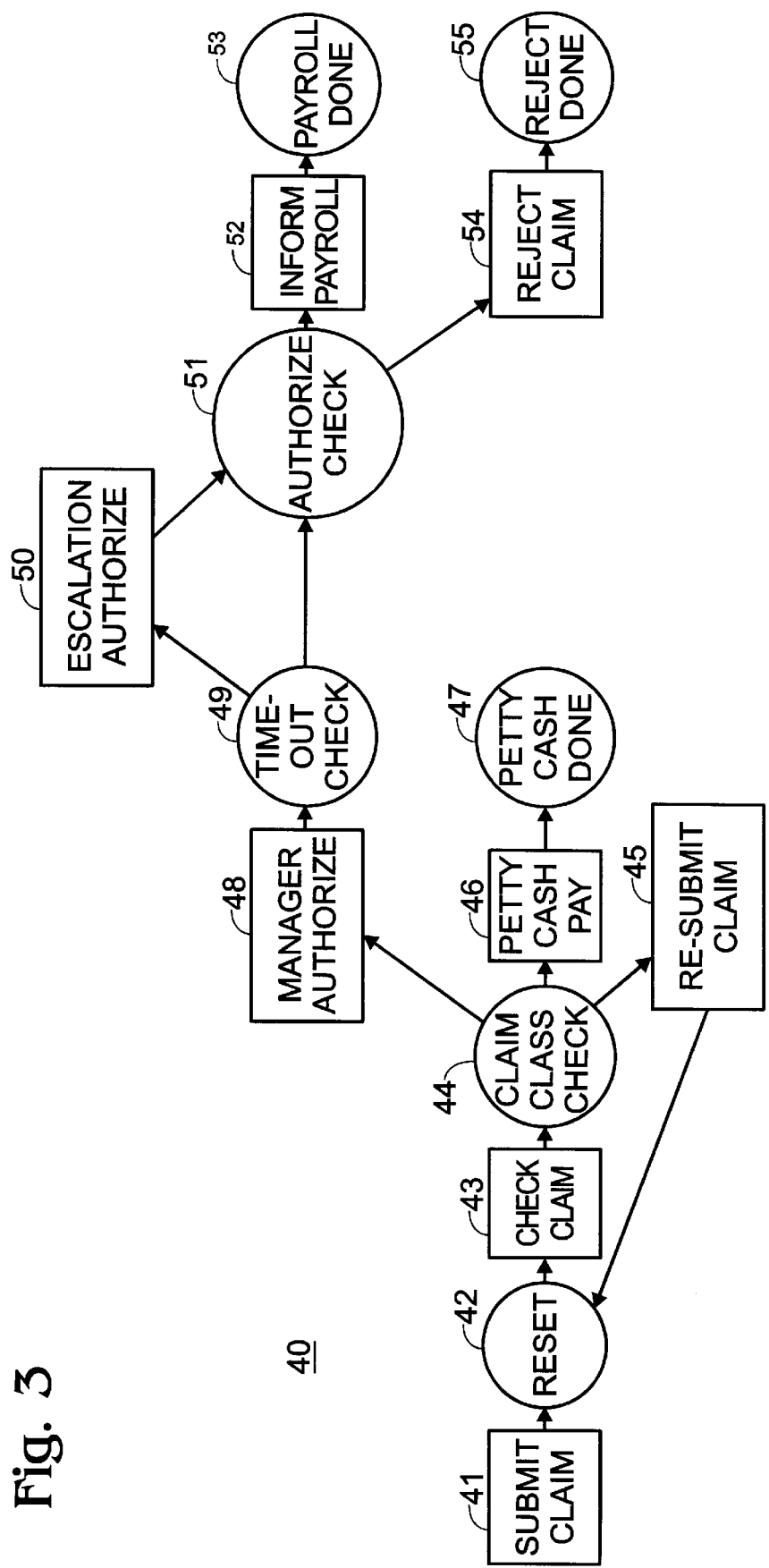
FIG. 3 is a computer display of the user interface for the user of the machine of FIG. 2 to interact with the process flow management system, the display showing an example of a process flow diagram for a business process flow managed by the system.

In general, a workflow process 18 is a description of the sequencing, timing, dependency, data, physical agent allocation, business rule and organization policy enforcement requirements of process activities needed to enact work. FIG. 3 shows, by way of example, a workflow process 18 which is represented as a directed graph 40 consisting of a set of nodes connected by arcs as displayed on the HP OpenPM user interface.

There are two kinds of nodes: work nodes 41, 43, 45, 46, 48, 50, 52, 54, which are shown as squares, and rule nodes 42, 44, 47, 49, 51, 53, 55, which are shown as circles. There are also two kinds of arcs, forward arcs and reset arcs. A work node has at most one inward arc and one or more outward arcs. A rule node can have any number of inward and outward arcs.

Forward arcs represent the normal execution flow of process activities and form a directed acyclic graph 40. Successful completion of a node at the source end of a forward arc triggers the starting of the node at the destination end of the forward arc.

Reset arcs are used to support repetitions or explore alternatives in a workflow process 18. Reset arcs differ from forward arcs in that they reach backwards in the process graph.

Work nodes 41, 43, 45, 46, 48, 50, 52, 54 represent activities to be performed external to the HP OpenPM engine 20. These activities include authorization, resource allocation, execution of business objects 93a–c and provision of input data for the business objects 93a–c and output data from them. Rule nodes 42, 44, 47, 49, 51, 53, 55 represent processing internal to the HP OpenPM engine 20. This processing includes decisions of about which nodes should execute next, generation or reception of events, and simple data manipulation.

A work node 41 is a placeholder for a process activity, which is a logical representation of a piece of work contributing towards the accomplishment of a process 18. A process activity is mapped to the invocation of an operation on business objects 93a–c during the execution of the process and each process activity can represent a manual operation by a human or a computerizable task to execute legacy applications 30, 31, 32, 33 (shown in FIG. 2), access application databases 34a, 34b (also shown in FIG. 2), control instrumentation, sense events in the external world or effect physical changes. A process activity definition includes a forward activity and optionally, a compensation activity, a cancel activity, a workflow management activity, timeout and deadline information and input and output data.

Rule nodes 42, 44, 47, 49, 51, 53, 55 are used to specify workflow processes 18 that are more complex than a simple sequence. A rule language is used to program the rule node decision. When executed, a rule node 42 determines which outward arcs to fire based on the status passed along the inward arcs, the time at which each inward arc is fired and process-relevant data associated with the process instance.

Rule nodes 42, 44, 47, 49, 51, 53, 55 are also used to support events. A rule node 42 can raise events when certain conditions are met as defined by the rules and an event can activate rule nodes that have subscribed to receive the event.

Rule nodes 42, 44, 47, 49, 51, 53, 55 are executed each time any inward arc fires. Work nodes 41, 43, 45, 46, 48, 50, 52, 54 have states of initial or fired. When the inward arc is fired on a work node 41 in the initial state, the work node 41 changes its state to fired and performs or requests its associated activity. When the inward arc is fired on a work node 41 in the fired state, nothing is done.

A reset arc, for example, between nodes 42–45, together with the forward arcs between its destination and source, forms a loop. When traversed, a reset arc causes all nodes 42–45 within its loop to be reset. Resetting a fired work node 43 changes its state to initial so that the node 43 can be re-executed. Resetting an active work node 43 cancels the current execution of the corresponding process activity and changes its state to initial.

Associated with each workflow process 18, there is a process data template defined by a workflow process designer module 22a (shown in FIG. 2). The process data template is used to provide initial data for the creation of process instances. At run time, based on the process data template and read/write lists of activities defined in a workflow process 18, HP OpenPM will generate a case packet for each process instance to facilitate data passing between activities and the HP OpenPM engine 20.

HP OpenPM Process Execution

Figure 4:
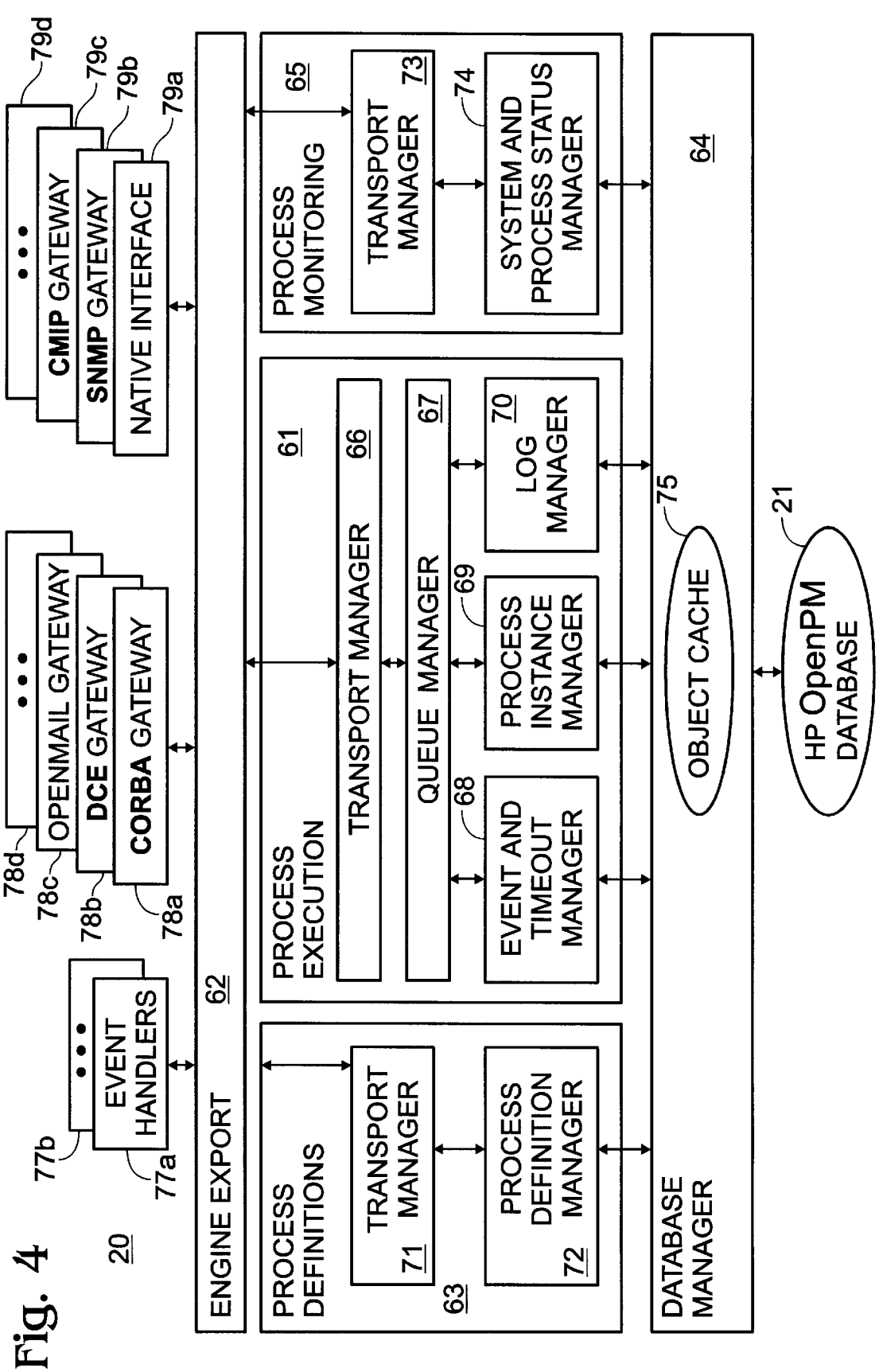
FIG. 4 is a block diagram of the preferred form of workflow process software engine that coordinates execution flow of the managed process.

FIG. 4 is a block diagram of the preferred form of a workflow process software engine, such as the HP OpenPM engine 20, that coordinates execution flow of the workflow processes 18. The HP OpenPM engine 20 functions as a highly reliable, log-based state machine which interfaces with external environments through a uniform CORBA-based transport interface, independent of the actual physical dispatch of the requests.

The HP OpenPM engine 20 launches workflow process instances in response to user requests. For each instance, the HP OpenPM engine 20 steps through the nodes in the directed graph 40 (examples shown in FIG. 3 and FIG. 7) according to the order specified in its workflow process definition. For work nodes, the HP OpenPM engine 20 executes the associated process (forward) activity. For rule nodes, the HP OpenPM engine 20 evaluates the rules and performs the rule actions when the rule conditions are met.

Each node transition is durably logged to facilitate forward rolling of incomplete workflow processes 18 at system restart time in the event of a system failure or to facilitate a support activity compensation process in the case of a process activity failure. In addition, the HP OpenPM engine 20 allows flexible specification of compensation scopes and actions, such as compensation activity or cancel activity, to support various application needs.

In the HP OpenPM engine 20, different versions of similar workflow processes 18 are supported by the engine 20 under the concept of a process group. A user can designate a particular version as the default version to be used when no specific version is requested at the time a workflow process instance is created.

To monitor the progress of running process activities and support system management, the HP OpenPM engine 20 maintains a comprehensive log of all events using a log manager 70 and provides a native interface 79a as well as an SNMP 79b and CMIP 79c gateways to facilitate integration with the HP OpenView environment. The formats and contents of the logged information can be customized to support specific application needs.

HP OpenPM Workflow Objects

The HP OpenPM engine 20 has to interact with process activities supported by various implementations encountered in real life. These activities can range from manual handling by users 14a–b to automated processes executed by computers 15a–b. An infrastructure is needed to enable the effective management and invocation of these process activities.

Distributed object technologies have become the primary infrastructure for enterprise-scale distributed computing. Among them, the OMG (Object Management Group) CORBA (Common Object Request Broker Architecture) technology has been developed to support interoperability for application integration.

Based on CORBA technology, in the HP OpenPM engine 20, an abstraction called a business object 93a (shown in FIG. 5) is built to encapsulate whatever piece of work each process activity has to accomplish. The wrapping code provides an IDL (Interface Definition Language) interface. The business objects are catalogued by a database manager 64 in the HP OpenPM business object library in business databases 94a–c (shown in FIG. 5). An object cache 75 is optionally used to optimize business object access.

A business object 93a, as defined by the OMG, is a representation of something active in the business domain, including its business name and definition, attributes, behavior and constraints. It provides a uniform way to encapsulate legacy systems and applications and a direct mapping, in understandable business terms, between the business model and the possibly sophisticated operational procedures of the workflow process system.

By representing these process activities in business objects 93a–c, new workflow processes 18 can be quickly created by assembling business objects 93a–c to describe workflow processes 18. The business object library avoids repetitive coding to tailor the process activity implementation to each individual workflow process 18.

HP OpenPM Resource and Policy Management

A resource is a person, computer process or machine that can be used to accomplish a task. A resource has a name and various attributes defining its characteristics, such as job code, skill set, organization unit and availability.

A policy is a set of rules that determines how resources are related to tasks within a WFPM system 10. One common use is for task assignment. Policies can be used to specify which resource, under which role, is eligible or available to perform a task. Policies are also used to ensure proper authorization and authentication.

In HP OpenPM, the mapping between the process activity (task) specified in a workflow process 18 and the business object (resource) to be invoked is performed by the resource manager 28a (shown in FIG. 2) during run time as part of the execution of the process activity. The HP OpenpM engine 20 allows multiple resource managers 28a–c to be used to resolve a single resource assignment request; each resolves the request at a different level within an organization.

HP OpenPM Worklist and Application Data Handlers

Figure 5:
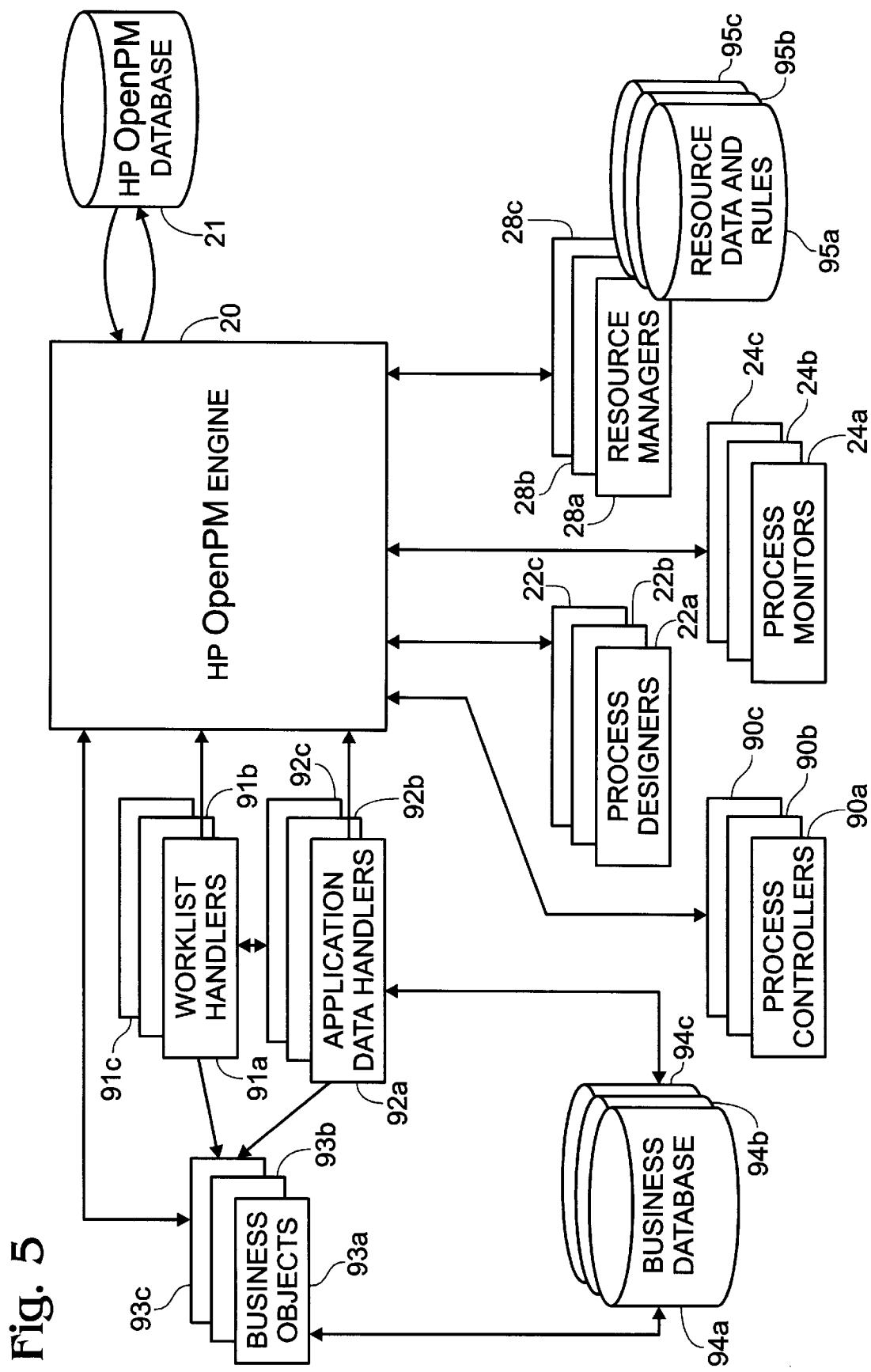
FIG. 5 is a block diagram of the system architecture with optional worklist handler ad application data handler features to enhance scalability.

FIG. 5 is a block diagram of the system architecture of FIG. 2 with optional features to enhance scalability of HP OpenPM systems. Two optional components that can be added into the HP OpenPM engine 20 environment to facilitate the execution of workflow processes 18 are worklist handlers 91a–c and application data handlers 92a–c.

The worklist handler 91a supports both engine-push and client-pull modes to provide more freedom in task assignment. In addition, the worklist handler 91a can be used to support the concept of integration on demand. Based on the task performer's profile, the worklist handler 91a determines and launches a specific environment for an activity at run time, rather than hard-wiring it into the process definitions.

The application data handler 92a supports the separation of application-specific data and process-relevant data to reduce the amount of data flow over the network. It also provides the preparation facility for application-specific data to remove the burden of database access from activity performers.

HP OpenPM Security

In today's business environments, security must be implemented enterprise-wide. The security service developed by the OMG provides authentication and encryption for the HP OpenPM engine 20 to prevent eavesdropping and forgery. The HP OpenPM engine 20 infrastructure components can identify each other and vouch for the credentials of end-user components.

WFPM in the Telecommunications Management Network

Figure 6:
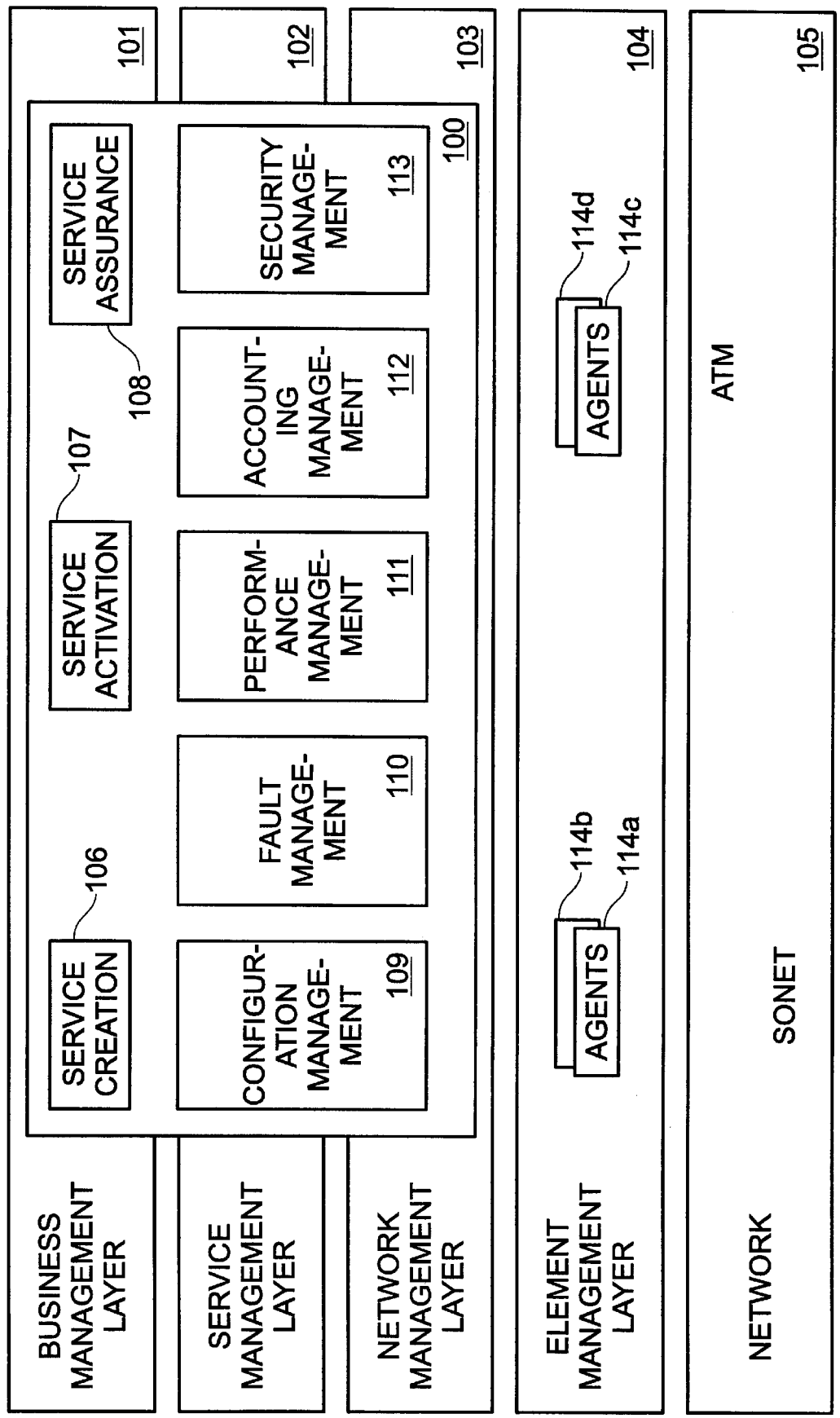
FIG. 6 is a diagram showing management function layers provided by business process flow management using the system of FIGS. 1–5 for the example of management of a telecommunications network.

FIG. 6 is a diagram showing management function layers 101, 102, 103, 104, 105 provided by workflow process management using the system of FIGS. 1–5 for an example of the management of a telecommunications network. The Telecommunications Management Network (TMN) defined by the International Telecommunications Union is changing the way operations support systems and business support systems solutions are being developed. The TMN architecture separates layers of functionality and provides access by elements in any one layer to any element in the layer immediately below, as shown in FIG. 6. Before the introduction of the TMN model, operations support systems and business support systems solutions were isolated from each other and could not interoperate.

The HP OpenView Distributed Management platform supports the realization of TMN operations support systems and business support systems solutions for the TMN element management layer 104 and network management layer 103. However, a middleware service is needed for supporting the service management layer 102 and even the business management layer 101 of the TMN model. The next section presents an example of this support.

At the service management layer 102, the WFPM process enabling framework is required to be able to support re-engineering and transformation processes for strategic operations support systems and business support systems, to integrate existing operational environments to form an enterprise hub for service management and provisioning, deploy new management services as rapidly as possible, to monitor and measure processes, to tune processes to benefit from experience and to automate processes to reduce execution time.

SONET Configuration Management Prototype

Figure 7:
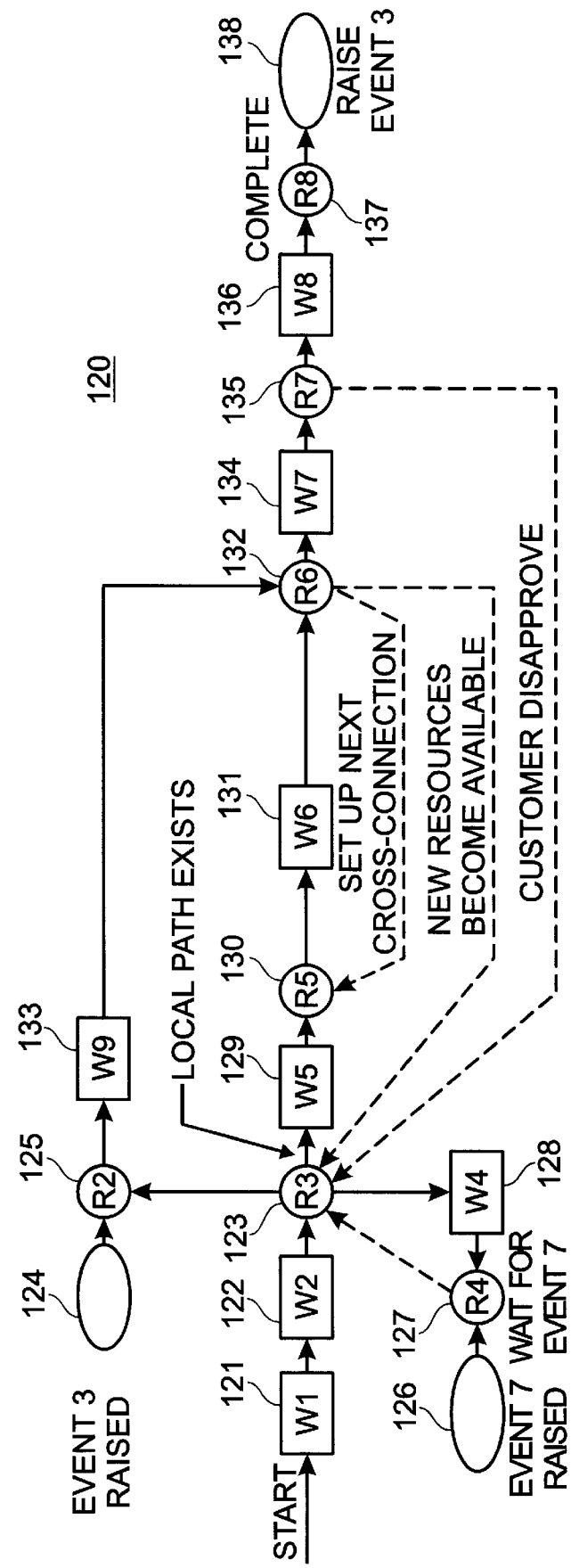
FIG. 7 is a process definition diagram for configuration management of the telecommunications network in the example of FIG. 6.

FIG. 7 is a process definition diagram for configuration management of the telecommunications network in the example of FIG. 6 based on the HP OpenPM system. It depicts a prototype to demonstrate the application of WFPM technology in the specific domain of SONET (Synchronous Optical Network) configuration management. The prototype was a joint project between HP Laboratories in Bristol, England and Palo Alto, Calif. to demonstrate the middleware technologies required to automate the processes supporting the configuration management of a SONET telecommunications network.

The scenario demonstrated by this prototype consists of the provision of a new VI4/VC12 path for customers. It goes through several different steps for this operation: search for a new route, negotiate the service level agreement (SLA) with the customer, configure the new path, and finally, update the SLA for this customer. The HP OpenPM process definition supporting the process of providing this new SONET data path is sketched in FIG. 7 which shows the HP OpenView process definition for SONET configuration management.

Searching for and configuring a new path in SONET are complex processes requiring a lot of interaction with the SONET MIB (Management Information Base) and network elements. This type of operation is a source of errors when it is performed manually by an operator as a set of individual, uncorrelated activities.

In the prototype, such complex operations as searching and configuring new paths are handled as workflow processes 18 and automated by an HP OpenPM engine 20 in an environment interacting with HP OpenView DM and Oracle DBMS applications.

Depending upon the changing business needs, a customer can request to add or drop communication paths between certain endpoints in a private virtual network (PVN). In HP OpenPM, these services can be modeled as workflow processes 18 to be executed by the service provider. Adding a new path may consist of the following activities and decision points:

1. Retrieve the customer's profile from the customer database for customer-PVN-specific information.
2. Locate the closest add-drop multiplexers (ADMs) to the endpoints, based on the information stored in the SONET physical configuration database.
3. Check whether fiber connections exist between the endpoints and the two end-ADMs.
4. If not, issue a request for an engineer to go on-site and physically connect the endpoints to the end-ADMs. After the establishment of the connection, the process continues on to step 5 and an independent subprocess is initiated to watch for resource changes.

5. Find valid routes between end-ADMs. This requires access to the routing table in the SLA database to determine whether any valid routes exist between the two end-ADMs. Either a list of ADMs is returned signifying the ADMs that must be configured to realize the route, or "No Route Found" is returned. For a returned list of ADMs, this activity will then use the HP OpenView DM facility agent to collect port information stored in the MIB to determine the available ports between the ADMs that are fibered together and can be used to enable the path.

6. Check network element (NE) capabilities. For an ADM in the route, this activity uses the HP OpenView DM NE agent to access the MIB information to determine whether a VC4 cross-connection can be set up in the ADM between the selected ports of the ADM. This activity has to be executed for each ADM in the route. During steps 5 and 6, if any additional resources become available, HP OpenPM cancels any currently running activity and starts the process over from step 5 to consider these newly available resources.

7. Get customer's approval of the selected configuration. Once a suitable path is identified, the customer will review the offer, including available date, charges, quality of services (QoS), and so on. Depending upon the business factors (e.g., cheapest service wanted), the customer may request that a new search be initiated, that is, loop back to step 5 to find another valid route.

8. Configure the selected route. This activity is responsible for setting up the cross-connections in each ADM by invoking the HP OpenView DM NE agent and updating the SLA database.

Flexible Workflow Process Compensation

Figure 8:
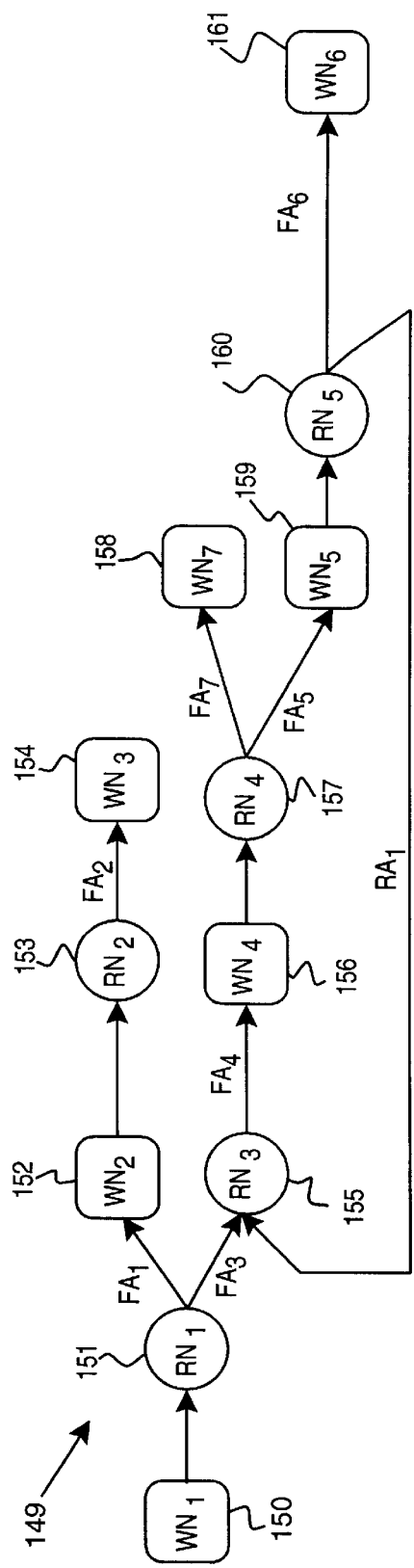
FIG. 8 is, by way of example, a process definition diagram for a synchronous digital hierarchy network configuration management process for use with the system architecture of FIG. 5.

FIG. 8 is, by way of example, a process definition diagram for a synchronous digital hierarchy (SDH) network configuration management process 149 for use with the system architecture of FIG. 5, such as described in J. Davis et al., "Flexible Compensation of OpenPM Workflow Processes," HP Labs. Tech. Report, HPL-96-72, May 1996, the disclosure of which is incorporated herein by reference for all purposes. Compensation of workflow processes involve undoing already completed transactions if not all transactions complete successfully. It is a complicated task that involves process designers' effort in part because business objects are too complex to be fully compensated automatically and different processes have different compensation needs which only process designers understand.

The process 149 sets up network connections between two given end points in an SDH network. The process consists of seven work nodes 150, 152, 154, 156, 158, 159, 161 and five rule nodes 151, 153, 155, 157, 160. The functions of the individual nodes are as follows:

$wn_1$ (150): Find two Add Drop Multiplexers (ADMs) close to the two end points.

$rn_1$ (151): Always fire both forward arcs $fa_1$ and $fa_3$ causing concurrent execution of $wn_2$ (152) and $rn_3$ (155).

$wn_2$ (152): Check for connections between the two end points and their corresponding ADMs.

$rn_2$ (153): Fire forward arc $fa_2$ if no connection exist between the end points and the end ADMs.

$wn_3$ (154): Add new lines to connect the end points to the end ADMs.

$rn_3$ (155): Always fire forward arc $fa_4$.

$wn_4$ (156): Find a route between the two end ADMs, check the capacity of the route and then confirm with the customer.

$rn_4$ (157): Fire forward arc $fa_5$ if there exists such a route. Also, fire forward arc $fa_7$ if any ADMs in the route reached capacity threshold.

$wn_7$ (158): Order new equipments for future use.

$wn_5$ (159): Configure the route by cross connecting ADMs in the route.

$rn_5$ (160): Fire forward arc $fa_6$ if the route has been configured successfully. Otherwise, fire reset arc $ra_1$ to find another route.

$wn_6$ (161): Create the trail by updating customer and configuration databases.

Work Nodes and Rule Nodes

As described below, the process 149 is represented as a directed graph comprising a set of nodes connected by arcs. In the directed graph, there are two kinds of nodes: work nodes 150, 152, 154, 156, 158, 159, 161, which do work, such as performing a manual task or executing a computer program; and rule nodes 151, 153, 155, 157, 160, which do routing by determining which outward arc to fire. Every activity instance has a start time and a complete time if it completes.

A work node 150 is a place holder for activities. There are three kinds of activities: forward, cancel and compensation. Each work node 150 is associated with a forward activity and may optionally be associated with a cancel or compensation activity. A forward activity is a logical representation of a piece of work contributing toward the accomplishment of the process. The process definition is mapped to the invocation of an operation on a business object 93a during the execution of the work node 150. Each invocation can effect a manual operation by a human or a computerizable task to execute a legacy application, access databases, control instrumentation, sense events in the external world or affect physical changes. A cancel activity is used to stop a currently running forward activity. A compensation activity is used to compensate an already completed forward activity.

A rule node 151 is used to define a process flow that is more complex than a simple sequence, such as concurrent process execution or the synchronization of tasks. In the described embodiment, each rule node 151 contains a list of condition-action rules. The condition is a boolean expression of values, such as the execution status of other nodes, the time at which each incoming arc was fired and other data used in the process instance. The action fires outgoing arcs.

Process flows can also be controlled via events which are raised and subscribed by rule nodes 151. Events received in a process instance can be raised within or without the same process instance. External events can be dealt with similarly by introducing a virtual rule node 151 that raises and subscribes to all external events. Similar to firing outgoing arcs, a rule node 151 raises an event when certain conditions as defined in rules are met. In response, the event activates all rule nodes 151 that have subscribed to it.

Types of Data

As defined by the Workflow Management Coalition, there are three different types of data in a workflow process: process-specific data used only by the OpenPM engine 20, such as for routing; process-relevant data used by both the OpenPM engine 20 and external applications; and application-specific data used by external applications only. Application-specific data is invisible to the OpenPM engine 20.

Every node reads and writes data. Work nodes 150 read and write only process-relevant data and application-specific data. Rule nodes 151 read and write only process-relevant data and process-specific data.

Directed Graph Representation of a Process

The process 149 is represented as a connected graph with every node in the graph having at least one inward or outward arc. Each rule node 151 can have any number of inward and outward arcs. Each work node 150 can have one inward arc and one outward arc, except the start work node 150 and end work nodes 154, 158, 161. The start work node 150 has no inward arc and is started when the process 149 begins execution. The end work nodes 154, 158, 161 have no outward arcs and their respective completions invoke no other nodes.

There are two kinds of arcs: forward arcs and reset arcs. A forward arc represents the normal execution flow of a process. A reset arc is used to create a loop in the process. It is critical that the forward arcs form a directed acyclic graph. The arc connecting rule node 160 to rule node 155 is a rest arc. All other arcs are forward arcs.

Forward and reset arcs behave differently. The completion of the source node of a forward arc invokes its destination node. By comparison, a reset arc, when traversed, causes all nodes within its scope to be reset. Resetting a completed work node 150 or rule node 151 changes the node's state to initial so it can be restarted. Resetting an active work node 150 cancels the current work of the process activity and changes its state to initial.

Process Definition

Referring back to FIG. 5, a process 149 is defined using a process designer 22a. Once defined, the process 149 can be started, stopped or intervened using a process controller 90a. A process monitor 24a keeps status information about each individual process 149 and loads information about the entire system. Each resource manager 28a has access to the information about resources usable by a process 149. At runtime, the resource manager 28a maps resources to process activities to perform tasks. The mapping is performed according to the role specification of process activities and the policies provided by the resource administrator. In addition, the resource manager 28a can consult other data sources in fulfilling requests, for example, a roster indicating who is in which department or on vacation.

The OpenPM engine 20 coordinates the overall business process execution and functions as a collection of highly reliable and log-based state machines, such as described in the related co-pending patent application entitled "SYSTEM AND METHOD FOR PERFORMING FLEXIBLE WORK-FLOW PROCESS EXECUTION IN A DISTRIBUTED WORKFLOW MANAGEMENT SYSTEM. " A scalable process flow system architecture which includes the OpenPM engine 20 is described in the related co-pending patent application entitled "SYSTEM AND METHOD FOR PERFORMING SCALABLE DISTRIBUTION OF PROCESS FLOW ACTIVITIES IN A DISTRIBUTED WORKFLOW MANAGEMENT SYSTEM. " An important task of the OpenPM engine 20 is to create execution instances of a process 149 and step through nodes as defined by the process diagram, such as shown in FIG. 8. The OpenPM engine 20 evaluates the rules 95a associated with each rule node 151 and performs the associated action for each rule whose condition is satisfied. An important feature of a rule node 151 is that it runs atomically, that is, it can read or write process-relevant data and fire outward arcs in the process diagram based on both process-relevant data and inward arc firing history. The set of rule nodes 151 can thus provide controlled process concurrency, including rendezvous points offering full or partial synchronization.

Compensation In OpenPM

The OpenPM engine 20 is also responsible for compensation when process execution fails. The purpose of compensation is to bring the failed process execution back to a consistent state so that the process can fix the problem and proceed again, possibly by trying a different path. There are four important issues regarding compensation: (1) when to compensate; (2) what to compensate; (3) how to compensate; and (4) how to proceed again. The first issue is straight forward: in general, compensation starts when a work node 150 fails, for example, due to a timeout condition or business object 93a failure.

The remaining issues depend on process structure, previous execution history and process and business object 93a semantics. However, semantics information concerning processes, such as data dependencies between nodes, may not be derivable from the process definition. Semantics depend on not only what business objects 93a–c are invoked at runtime, but also on the order in which they are invoked. Therefore, the OpenPM engine 20 is incapable of performing process compensation alone and must rely on process designers to specify what to compensate, how to compensate and how to proceed again after compensation has completed.

The described embodiment differs from other similar systems by allowing flexible specification of compensation. For each forward activity definition, the process designer 22a can specify a compensation scope and a compensation activity. The compensation scope determines which other nodes need to be compensated when a work node 150 fails. The compensation activity defines how the work node 150 will be compensated when it is within other work nodes' compensation scopes. Thus, at runtime, the OpenPM engine 20 makes sure that:

(1) The process execution is rolled back to the specified consistent state, as specified by the compensation scope.

(2) Previously completed nodes in the compensation scope are compensated in the proper order to preserve the correct semantics of the business process.

(3) The process execution is resumed when compensation completes.

(4) The compensation overhead is minimized.

The OpenPM engine 20 compensation scheme is log-based. The OpenPM engine 20 records every significant event of process execution, such as node activation and completion, in a persistent log file which provides substantially all of the runtime information needed for process compensation.

Compensation Specification

The compensation specification addresses the second and third issues of what and how to compensate. What to compensate is specified by defining a compensation scope. How to compensate is performed via compensation activities. First, compensation scope specification includes assigning a start compensation point, an end compensation point and a scoping strategy that determines what nodes in between the start and end compensation points should be compensated. Compensation overhead should be kept to a minimum and preferably avoid compensating, and therefore re-execution, business objects 93a–c whenever possible.

In the described embodiment, the start compensation point is always the current work node 150 whose process activity has failed. The OpenPM engine 20 provides several different end compensation point specifications and scoping strategies, but relies on process designers 22a–c to choose the proper one for their processes.

Compensation Scope

The various dependencies between process nodes determine how nodes affect each other and therefore which other nodes need compensation when one fails.

Types of Node Dependencies

In general, a work node 150 needs to be compensated if it has been directly or indirectly effected by the original execution of the end compensation point. A work node 150 can be effected by another node via either data dependency or execution dependency. A data dependency means the work node 150 reads data updated by the end compensation point. An execution dependency means the execution of the end compensation point may or may not imply that of the affected work node 150. Data dependencies are important as re-execution of a work node 150 can produce different values of the data read by affected nodes. Execution dependencies are equally important as the re-execution of a node can invoke different nodes.

Data dependencies and execution dependencies will now be discussed.

Data Dependencies

Three kinds of data dependencies are defined according to the kinds of data involved: process-specific; process-relevant; and application-specific. Process-specific data is data involved in the execution of a process 149 that only concern the scheduling and controlling of the process 149. Process-relevant data is data involved in the execution of a process 149 of concern to the activities making up the process 149 but independent of the scheduling and controlling. Application-specific data is data of concern to both one or more of the activities and the scheduling and controlling. Process-specific and process-relevant data dependencies are identifiable by the OpenPM engine 20. Application-specific data dependencies are invisible to the OpenPM engine 20.

Execution Dependencies

A work node 152 is affected by another work node 150 via an execution dependency if the execution status of the first work node 152 depends on the execution result of the second work node 150. The dependency is important, as the execution status of the affected work node 152 may be effected by the compensation and re-execution of the first work node 150. For example, assume that work node 154 was executed during the original execution as the result of work node 152's execution. However, rule node 151 might choose a different execution path that does not include work node 152 at re-execution time and work node 152 may produce different results that effect rule node 151's decision. Therefore, work node 154 might have to be compensated but not re-executed as the result of work node 152's compensation and re-execution.

Although execution dependencies are visible to the OpenPM engine 20, these dependencies can be difficult to compute because they involve the semantics of the rule nodes 151. However, structure dependencies can simulate execution dependencies and can be easily computed at specification time. Structure dependencies generally imply either a data or an execution dependency. A node is structurally dependent upon another node if the first node is reachable from the second node or the second node raises an event that has bee subscribed by the first node.

Compensation Scoping Strategies

The compensation scope consists of nodes effected by the end compensation point and is therefore a function of the end compensation point. Based on the dependencies described above, several scoping strategies can be defined. The OpenPM engine 20 is responsible for executing forward, cancel and compensation activities in the proper order. In other words, the OpenPM engine 20 makes sure that all conditions, except compensation completeness, are met for a process execution. A scoping strategy is compensation complete if the resultant executions are compensation complete. The process designer is responsible for using proper compensation scoping strategies to guarantee correct process executions.

In the described embodiment, five compensation scoping strategies are employed: minimal; temporal-based; computable; structural-based; and extended. The compensation scoping strategies will now be discussed.

Minimal Compensation Scope

The minimal compensation scope (MCS) defines the exact compensation scope which includes only the nodes that are effected by the end compensation point. It depends upon the execution history, including application-specific and process-relevant data as well as the exact state of the process 149. The minimal compensation scope is the smallest scope that results in correct compensation and does not include any compensation that is always unnecessary. Only nodes that are effected by the re-execution of the end compensation point via data and execution dependencies are included in the minimal compensation scope. However, minimal compensation scope is not computable by the OpenPM engine 20 at process definition time nor at runtime since application-specific data is invisible to the OpenPM engine 20. Thus, the OpenPM engine 20 is unable to determine the application-specific data dependencies. The MCS is formally defined in J. Davis et al., "Flexible Compensation of OpenPM Workflow Processes," at p. 13, cited hereinabove.

Temporal-Based Compensation Scope

The temporal-based compensation scope (TCS) defines the biggest compensation scope and is also the easiest scope to implement. It includes all nodes that are activated after the end compensation point completed in time, independent of whether they have been effected by the end compensation point. Temporal-based scoping is guaranteed to be complete because all nodes that started execution after the end compensation point completed are compensated. This compensation scope is the only strategy that is both computable and guaranteed safe independent of the structure and previous execution of the process. It is also the easiest to compute because the scope can be determined by simply searching the system log file. It has the disadvantage of heavy compensation overhead from potentially unnecessary compensation. The TCS is formally defined in J. Davis et al., "Flexible Compensation of OpenPM Workflow Processes," at pp. 13–14, cited hereinabove.

Computable Compensation Scope

The computable compensation scope (CCS) includes all nodes that: (1) are executed after the end compensation point; and (2) are effected by previous execution of the end compensation point node via both structure dependency and process-relevant data dependency, as well as their transitive closures. It is a subset of the minimal compensation scope defined using only dependency information available to the OpenPM engine 20. It provides the best estimation of the minimal compensation scope based on available information if there are no application-specific data dependencies between nodes. It has the disadvantage of having a compensation scope that is difficult to compute, even at runtime because execution dependencies are determined by rule node 151 semantics.

At runtime, the CCS for a node $i_2$ is determined as follows:

```
determine CCS (i₂) {
    scope = i₂;
    for each (i₃ in the log file)
        for each (i₄ ∈ scope)
            if (i₄ →ᶜᵈ i₃) or (i₄ →ᵖˢᵈ i₃) or (i₄ →ᵖʳᵈ i₃)
                scope = scope ∪ i₄;
    return(scope);
}
``` where $i_2$, $i_3$ and $i_4$ are nodes in the process diagram, scope is the compensation scope, ed represents an execution data dependency, psd represents a process-specific data dependency and prd represents a process-relevant data dependency. The CCS is formally defined in J. Davis et al., "Flexible Compensation of OpenPM Workflow Processes," at p. 14–15, cited hereinabove.

Structural-Based Compensation Scope

The structural-based compensation scope (SCS) includes all nodes that: (1) were started after the end compensation point completed; and (2) depend on the end compensation point via structure dependency. This compensation scope is the simplest to compute and can be done at process specification time. The assumption is that structurally independent nodes usually do not affect each other, although the assumption may not be true for all processes. This strategy should be used only when the process designer is certain no other nodes are structurally dependent upon the end compensation point.

There are two steps in computing the SCS. First, at definition time, the OpenPM engine 20 identifies all nodes that are reachable from a given node to form forming a superset of the SCS. At runtime, the OpenPM engine 20 checks the system log file to remove from the superset those nodes that have not yet been started, that is, not recorded in the log file, resulting in the SCS. The SCS is formally defined in J. Davis et al., "Flexible Compensation of OpenPM Workflow Processes," at p. 15, cited hereinabove.

Extended Compensation Scope

The extended compensation scope (XCS) strategy defines a bigger compensation scope than the SCS strategy by including nodes effected via process-relevant and process-specific data. The XCS strategy is similar to the CCS strategy but easier to compute as the XCS strategy does not use semantic information for the rule nodes 151. Also, similar to the CCS strategy, the XCS strategy guarantees correct compensation only if nodes do not depend on each other via application-specific data.

At runtime, the XCS for a node $i_2$ is determined as follows:

```
determine XCS (i₂) {
    scope = i₂;
    for each (i₃ in the log file)
        for each (i₄ ∈ scope)
            if (i₃ ∈ Reachable(i₄)) or (i₄ →ᵖˢᵈ i₃) or (i₄ →ᵖʳᵈ i₃)
                scope = scope ∪ i₄;
    return(scope);
}
``` where $i_2$, $i_3$ and $i_4$ are nodes in the process diagram, scope is the compensation scope, psd represents a process-specific data dependency and prd represents a process-relevant data dependency. The XCS is formally defined in J. Davis et al., "Flexible Compensation of OpenPM Workflow Processes," at pp. 15–16, cited hereinabove.

In summary, the minimal compensation scope is the preferred strategy but generally cannot be determined by the OpenPM engine 20. The temporal-based compensation scope is the only strategy that is both computable and guaranteed to be safe. By default, the OpenPM engine 21 will use the temporal-based compensation scope when no strategy has been specified. The OpenPM engine 20 also supports structure-based, extended and computable scoping strategies as an optimization to temporal-based compensation scope. The process designer 22a is responsible for properly using these strategies. Improper uses of structure-based, extended or computable strategies can result in incorrect compensation.

Given a process execution p of a process definition P and $i \in p$, the relationship of the compensation scoping strategies is as follows:

CCS(i)⊆MCS(i)⊆TCS(i).
SCS(T)⊆XCS(T)⊆TCS(i).
CCS(i)⊆XCS(i)⊆TCS(i).

Figure 9:
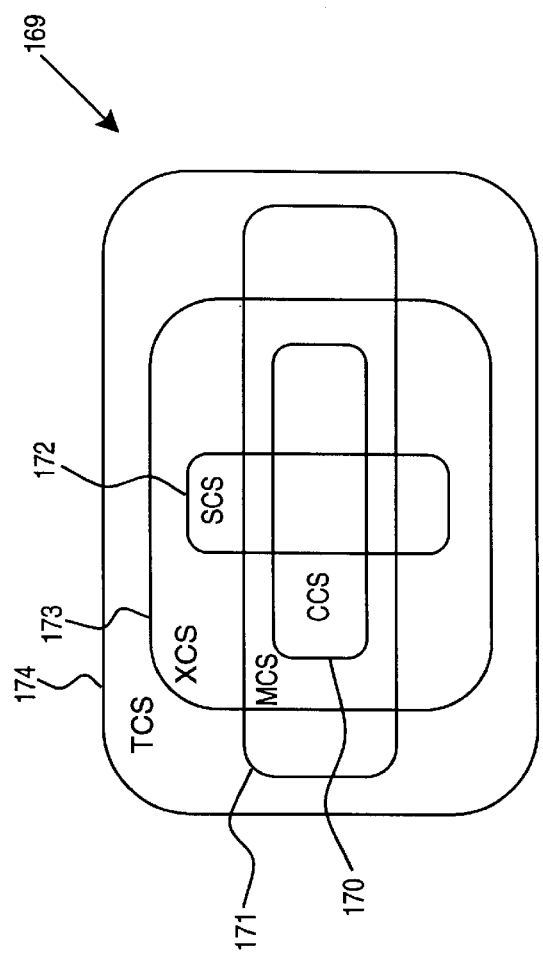
FIG. 9 is a block diagram of a comparison of compensation scoping strategies using the system architecture of FIG. 5.

FIG. 9 is a block diagram of this comparison of compensation scoping strategies using the system architecture of FIG. 5.

History information has been used in all dependency definitions, and therefore most of the above scoping strategies, except the structural-based strategy, for computing compensation scope at runtime using execution histories. This approach avoids unnecessary compensation, as it eliminates some dependencies that did not occur during the execution.

End Compensation Points

End compensation points are important in compensation specification for the following three reasons. First, end compensation points represent crucial stages of process execution to which execution should be rolled back when a failure occurs. Second, they are the end points at which the compensation process stops. Finally, end compensation points are also the start points from which process execution can be resumed. The process designer 22a is responsible for identifying possible end compensation points and marking them as save points.

A save point can be designated as the end compensation point for work nodes 150. In the described embodiment, an end compensation point can be:

(1) a specific save point (specified using node names);
(2) the last save point executed; or
(3) the last predecessor save point (from which the current node is reachable).

The last executed save point is the nearest save point from the current work node 150 and is only known at runtime. The last predecessor save point is the nearest save point whose execution always effects the current work node 150 and is computable at process definition time. The last executed save point is determined by searching the system log file starting from the end and proceeding in reverse order. The last predecessor save point is computed by following the forward arcs from the current work node 150 in reverse order.

When a node is specified, the process designer 22a ensures that: (1) the node has been marked as a save point; and (2) the node is not reachable from the current work node 150. The latter condition is important as otherwise the end compensation point will never complete before the current work node 150. If the scoping strategy is the structural-based, extended or computable, the process designer 22a must also ensure that the current work node 150 is reachable from the specified save point. This condition is necessary to ensure that the compensation scope is not empty.

The process designer 22a can specify the last save point executed as the end compensation point for a work node 150 only if the scoping strategy for the work node 150 is temporal-based. This restriction is necessary because the current work node 150 might not be reachable from the last executed save point. Similarly, if the end compensation point is specified as the last predecessor save point, the OpenPM engine 20 will make sure that the current node is reachable from the last predecessor save point.

Figure 10:
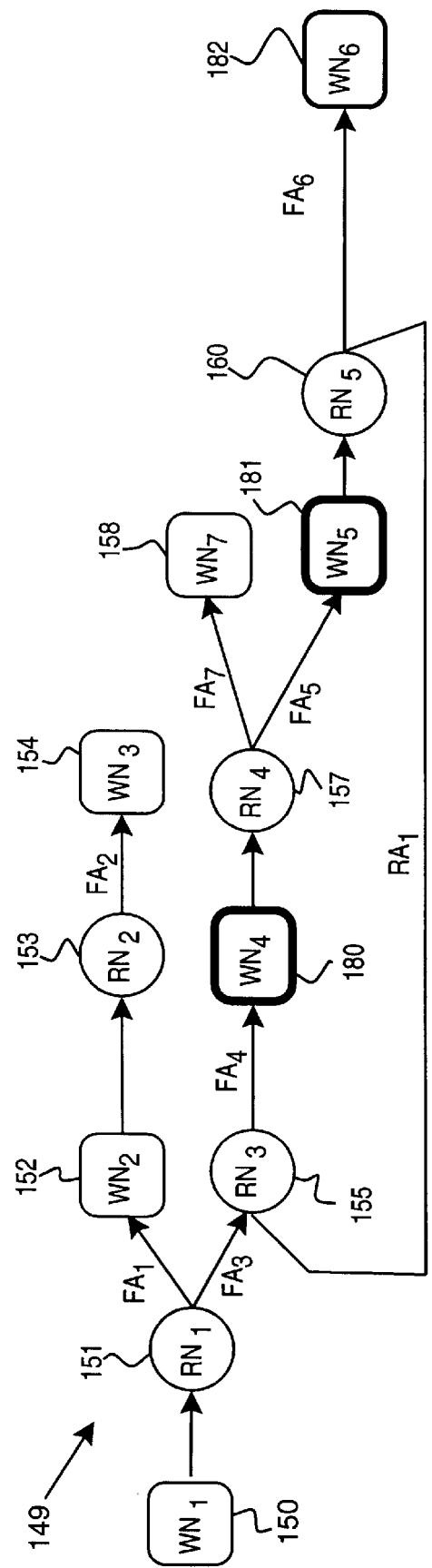
FIG. 10 is, by way of further example, the process definition diagram of FIG. 8 augmented with save poets and a failed node.

FIG. 10 is, by way of further example, the process definition diagram of FIG. 8 augmented with save points and a failed node. Work nodes 180 and 181 have been marked as save points and work node 182 can use either work node 180 or 181 as its end compensation point. Thus, if work node 182 fails, that is, it cannot create the trail as configured in work node 181, the process 149 will either rollback to work node 181 to try different cross connections or rollback even further to work node 180 to try different routes.

Suppose that the process execution failed at work node 182 and work node 181 has been specified as the end compensation point for work node 182. The structural-based compensation scope contains only work nodes 181 and 182. The temporal-based compensation scope depends on the order in which work nodes 154, 181 and 182 were executed. The task of connecting end points to end ADMs is performed by work node 154 and the task of cross connecting ADMs is performed by work node 181. These two nodes share the same data; in particular, they share the ports of end ADMs at which end points are connected and end ADMs are cross connected. The tasks for work nodes 154 and 181 can be performed in any order, but the node that executes later has to use the same port already in use by the other node. Thus, work nodes 154 and 181 depend on each other's execution results. However, their execution order is not important and therefore has not been enforced in the process. Moreover, there is no dependency between work nodes 181 and 158.

Suppose that the ADM cross connection ports were process-relevant data and therefore were visible to the OpenPM engine 20. Then, the extended compensation scope would for work node 182 would include work nodes 154, 181 and 161. However, the extended compensation scope would not include work node 154 if the ADM cross connection ports were application-specific data.

Compensation Activities

Having determined which nodes to compensate, the final issue is how to compensate each forward activity of the nodes. The compensation of a process activity can be complex and can even involve manual interactions. In the described embodiment, the solution uses activities to compensate and cancel forward activities. More specifically, the compensation specification is itself an activity whose purpose is to compensate previously completed executions of the containing activity.

The definition of an activity is separated from its use. All activities, that is, forward, compensation and cancel activities, are defined in the same way. An activity can be used in different places for different purposes. Therefore, both process and compensation activities can invoke external applications, possibly even the same application. Similarly, both process and compensation activities can have cancel activities specified to terminate themselves whenever necessary.

The major advantage of using activities to compensate or cancel activities is flexibility. For example, the process designer 22a can design complex activities to compensate a process activity. Cancelation of compensation activities can also be readily supported. Finally, separating definition from use increases reusability. An activity, once defined, can be repeatedly used and possibly for different business purposes.

Compensation Implementation

Figure 11A:
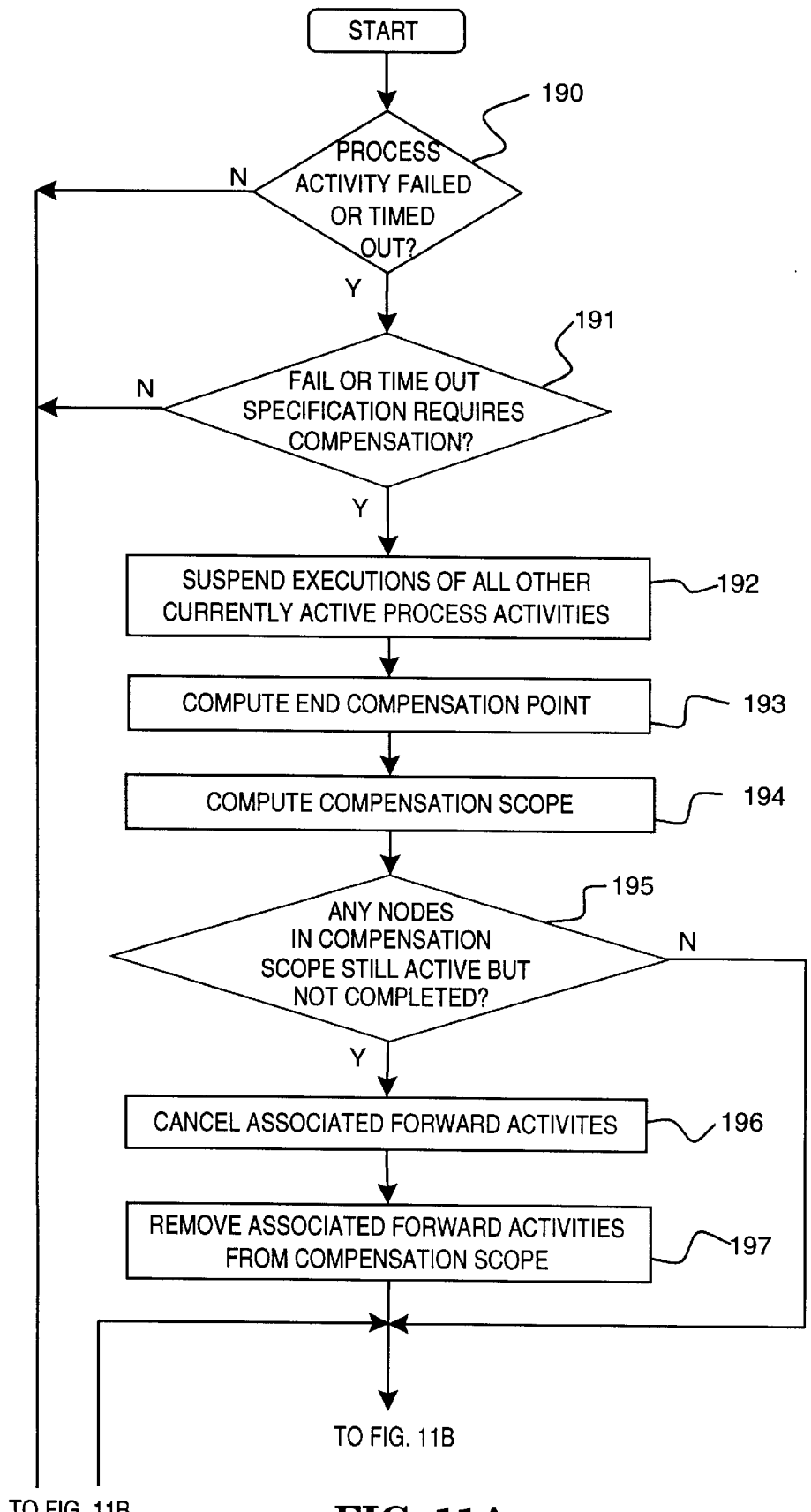
FIGS. 11A and 11B are a flow diagram of a method for performing compensation according to the present invention with the compensation manager incorporated in the system architecture of FIG. 5.
Figure 11B:
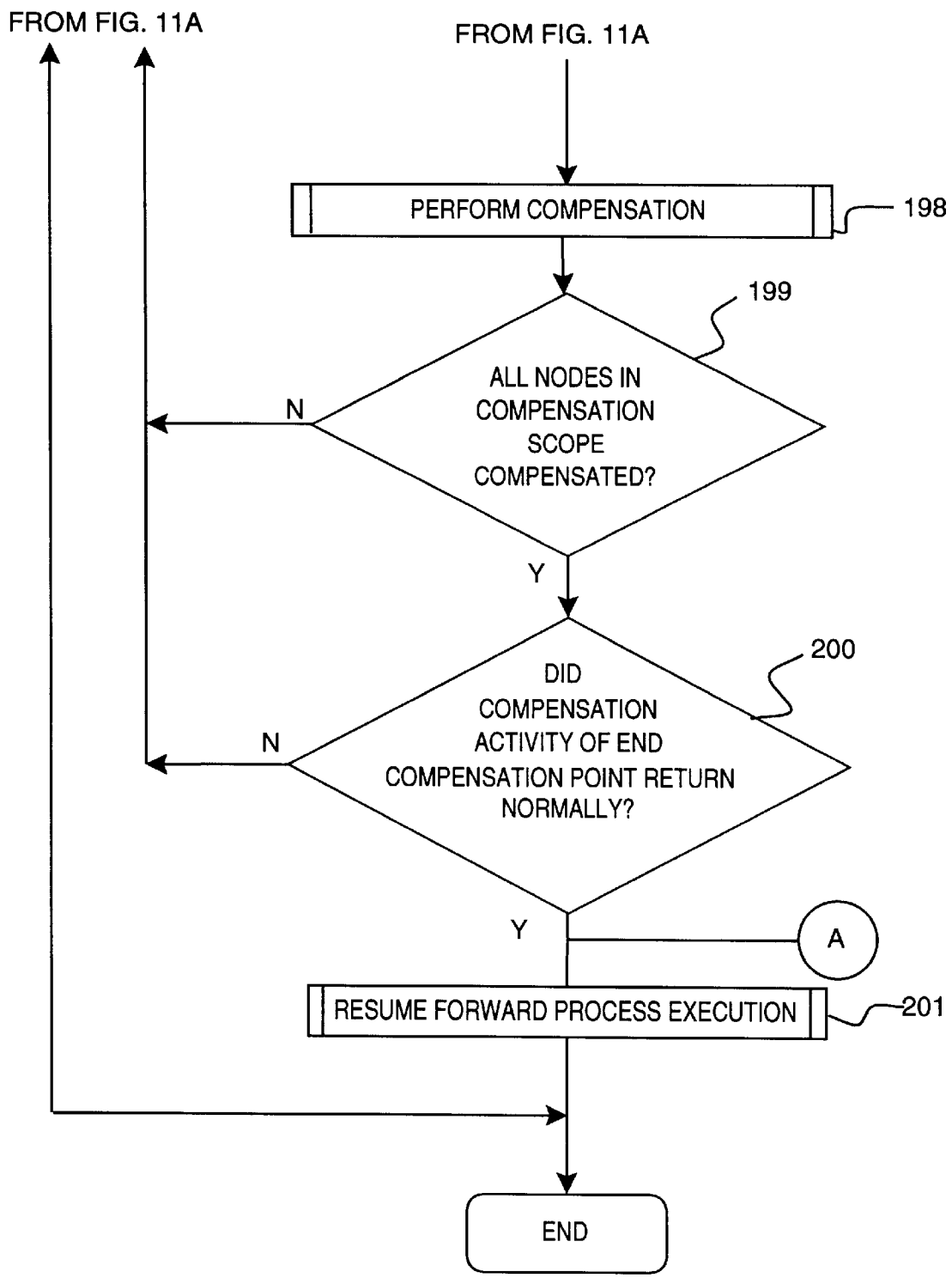

FIGS. 11A and 11B are a flow diagram of a method for performing compensation according to the present invention with the compensation manager incorporated in the system architecture of FIG. 5. The OpenPM engine 20 (shown in FIG. 5) starts the compensation manager whenever a process activity (shown in FIG. 10) has failed or timed-out and the specification requires compensation. The OpenPM engine 20 relies on the system log file for process execution history, such as determining which nodes 150 have been started or completed and when. In the normal case, if the process activity has not failed or timed out (block 190), the compensation manager does nothing and the method terminates. Similarly, if the fail or time out specification does not require compensation (block 191) in the event of a failure or time out, the compensation manager does nothing and the method terminates.

Conversely, if the process activity has failed or timed out (block 190) and the fail or time out specification requires compensation (block 191), the compensation manager takes the following steps. Executions of all other currently active process activities are suspended (block 192). The end compensation points, as described above, are computed (block 193) as follows:

(1) Specific save point: do nothing.
(2) Last executed save point: search system log file from its end in reverse order until a node marked as a save point is encountered.
(3) Last predecessor save point: look up save point in process definition.

Next, the compensation scope, as described above, is computed (block 194). If no nodes in the compensation scope are active but incomplete (block 195), compensation is performed (block 198) as further described below with reference to FIG. 12. However, if there are active incomplete nodes in the compensation scope (block 195), the associated forward activities are cancelled (block 196) and the associated forward activities are removed from the compensation scope (block 197). Compensation is then performed (block 198) as further described below with reference to FIG. 12. Ordinarily, the nodes in the compensation scope will be compensated one at a time in the reverse order as they have been completed in the system logfile until all nodes in the compensation scope have been compensated (block 199). Once all nodes in the compensation scope have been compensated (block 199) and if the compensation activity of the end point returned normally (block 200), the forward process activities are resumed (block 201) as further described below with reference to FIG. 13 and the method then terminates. However, if the end compensation point's compensation activity returned abnormally (block 200), compensation is again performed (block 198).

Figure 12:
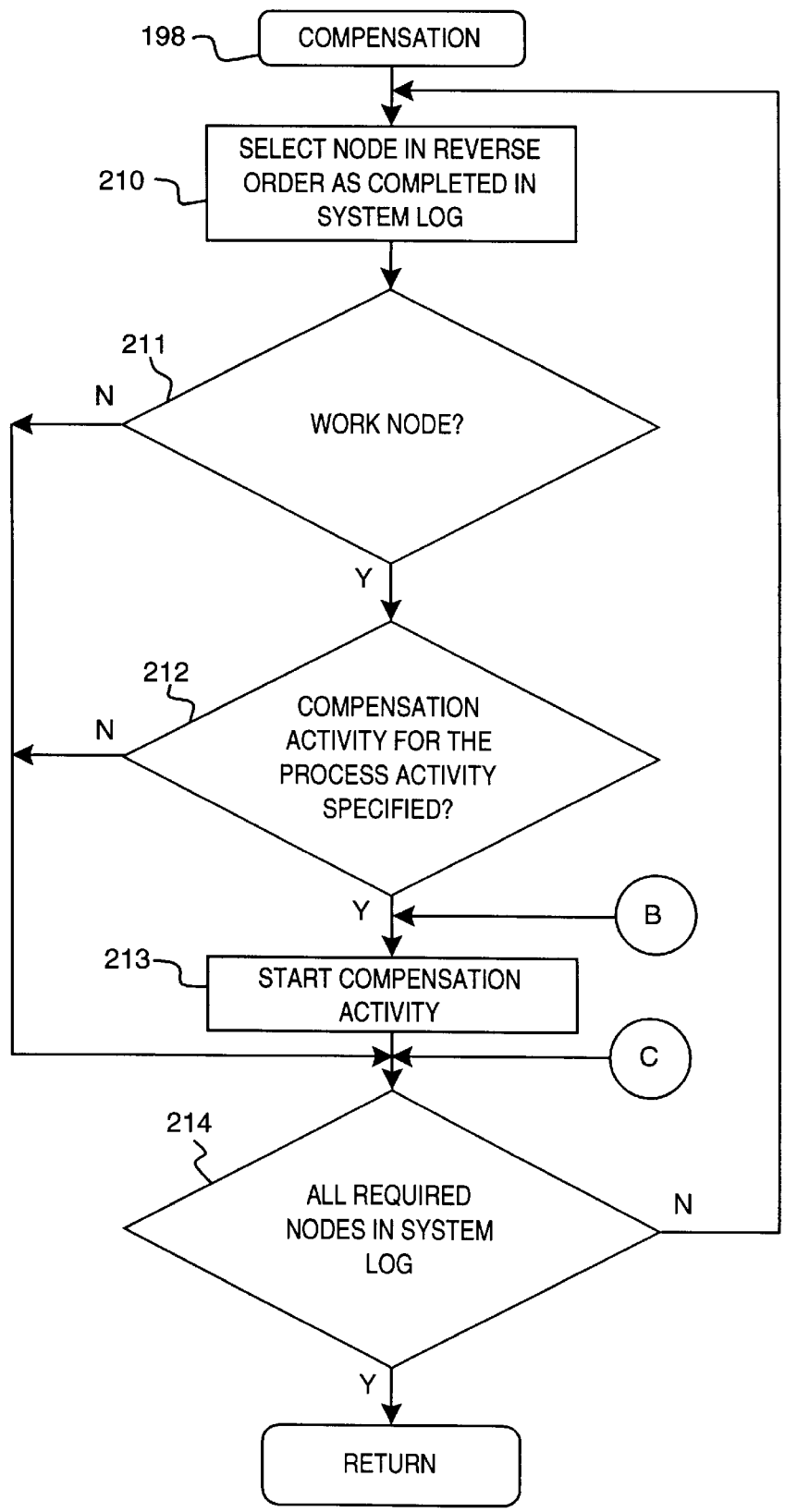
FIG. 12 is a flow diagram of a routine for performing compensation in the method of FIGS. 11A and 11B.

FIG. 12 is a flow diagram of a routine for performing compensation (block 198) in the method of FIGS. 11A and 11B. Blocks 210–214 form a iterative loop for processing each node in the compensation scope. A node is selected from the system log file in the reverse order as completed (block 210). If the node is not a work node 150 (block 211), the node is skipped. Otherwise, for each work node 150 (block 211), if a compensation activity for the process activity has been specified (block 212), the compensation activity is started (block 213). The iterative loop is repeated until all required nodes in the system log file have been compensated (block 214). The routine then returns.

Figure 13:
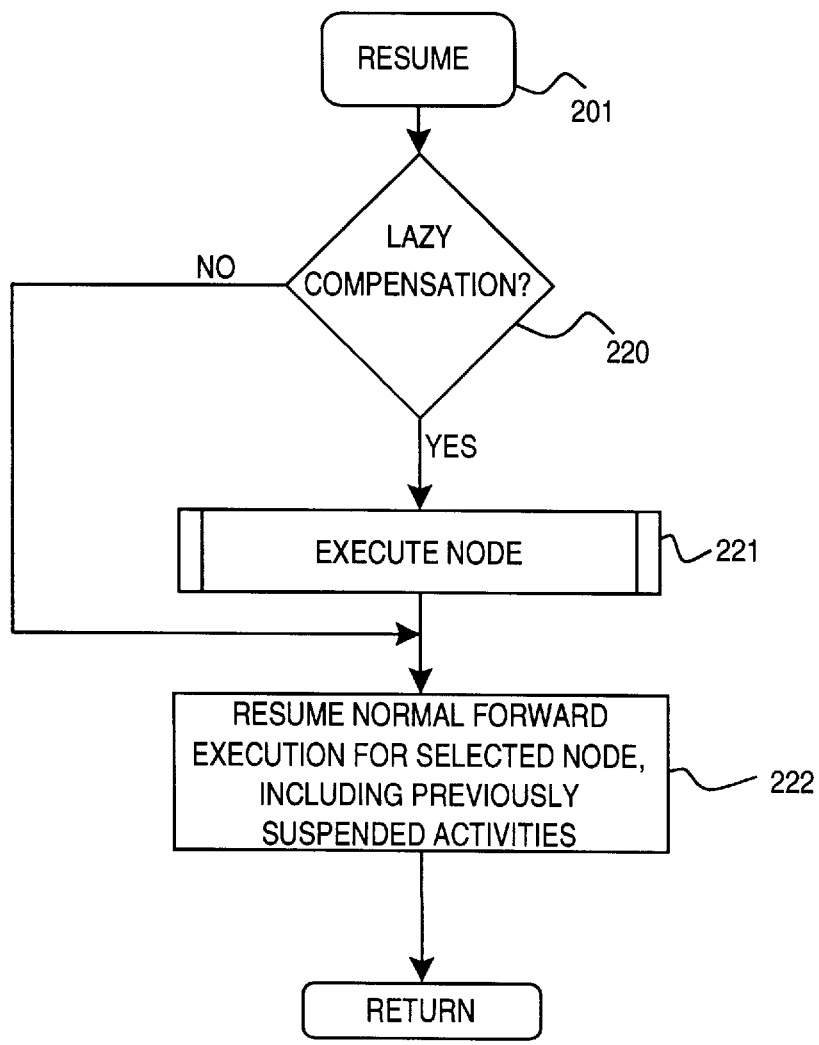
FIG. 13 is a flow diagram of a routine for resuming forward process execution in the method of FIGS. 11A and 11B.

FIG. 13 is a flow diagram of a routine for resuming forward process execution (block 201) in the method of FIGS. 11A and 11B. As described below with reference to FIG. 16, a further embodiment of the present method employs a technique known as lazy compensation to avoid, under certain circumstances, the compensation and re-execution of certain process activities. If lazy compensation is being employed (block 220), the node is executed by the routine described in the further embodiment of the present invention for performing node re-execution during lazy compensation. Otherwise, if lazy compensation is not being employed (block 220), normal forward execution is resumed for the selected node, including any previously suspended activities (block 222). The routine then returns.

Compensation Cascading

Figure 14:
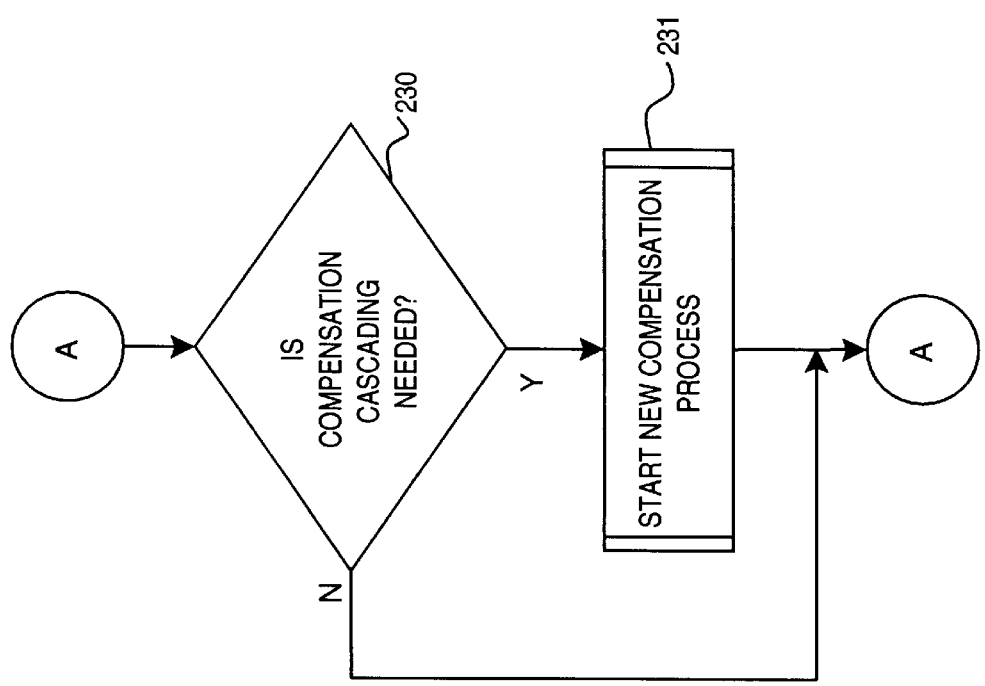
FIG. 14 is a flow diagram of a further embodiment of the present invention for performing compensation cascading in the method of FIGS. 11A and 11B.

FIG. 14 is a flow diagram of a further embodiment of the present invention for performing compensation cascading in the method of FIGS. 11A and 11B. At runtime, a compensation activity for a save point could encounter an unpredictable failure or have tried all of its alternatives yet the activity still fails. The OpenPM engine 20 (shown in FIG. 5) allows cascading of compensation processes for resolving this problem. The compensation activity for a save point can instruct the OpenPM engine 20 to extend the compensation scope by cascading to the next save point. The compensation cascading enables the compensation activities for the non-save points, for instance, to set up process-relevant and application-specific data in the execution environment. These compensation activities are often capable of remedying problems that may cause failures at runtime. Thus, when the associated process resumes execution, it can proceed successfully.

Compensation cascading might be useful when failures are caused by an improper decision made outside the current compensation scope. For example, referring back to FIG. 10, if work node 182 failed because rule node 157 chose a route that does not meet the customer's reliability requirements, re-cross connecting the ADMs will not solve the problem. In this case, work node 181 might choose to cascade the compensation further to work node 180 which in turn will choose a new route that meets the customer's requirements.

The semantics for compensation cascading is the same as for the failure of the current end compensation point. No extra specification is needed for compensation cascading; instead, the end compensation point specification of a save point serves both as the regular end compensation point and as a new start compensation point for cascading. The OpenPM engine 20 simply starts a new set of compensation process activities by using the old end compensation point as the new start compensation point.

Compensation cascading augments the basic flexible compensation scheme as follows. Referring back to FIGS. 11A and 11B, two additional steps (blocks 230–231 shown in FIG. 14) are introduced just prior to resuming forward process execution (block 201). When the end compensation point finishes, its compensation activity will instruct the OpenPM engine 20 whether cascading is needed (block 200). If compensation cascading is not needed (block 230), forward process execution is resumed (block 201). Otherwise, if compensation cascading is needed (block 230), a new compensation process is started (block 231) such as described with reference to FIG. 12 with the OpenPM engine 20 in effect assuming the current end compensation point has failed.

Lazy Compensation

Figure 15:
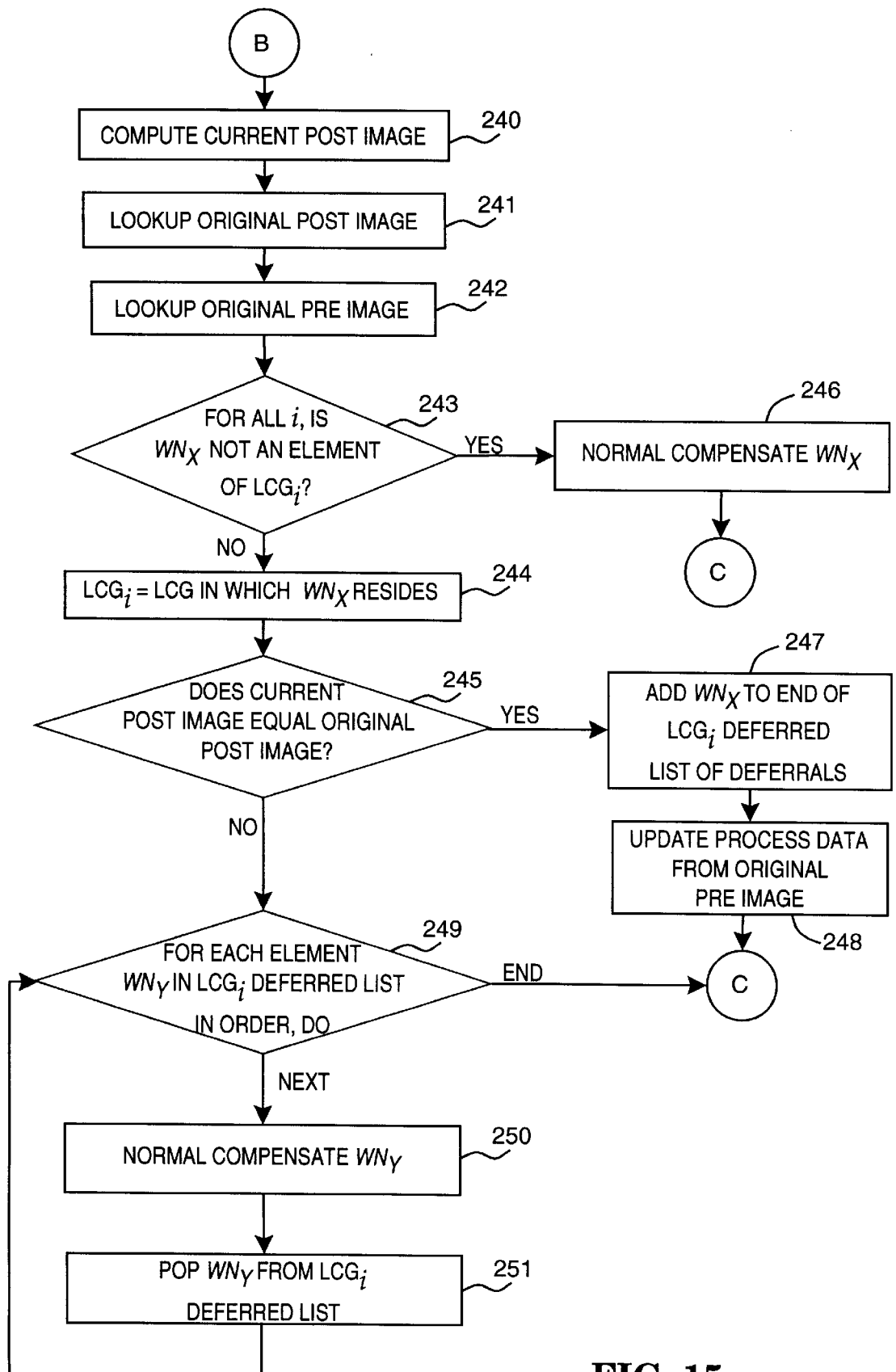
FIG. 15 is a flow diagram of a further embodiment of the present invention for performing node compensation during lazy compensation in the routine of FIG. 12.

FIG. 15 is a flow diagram of a further embodiment of the present invention for performing node compensation during lazy compensation in the routine of FIG. 12. Referring back to FIG. 12, the steps shown in FIG. 15 replace the step of starting a process activity (block 213 of FIG. 12). Their purpose is to defer compensation of a work node 150 using lazy compensation at runtime if the process-relevant data input to the work nodes 150 in each lazy compensation group ("LCG"), described further below, is the same as the input data used by each work node 150 during their respective original executions.

The central goal of lazy compensation is to provide selective compensation of workflow processes by excluding work nodes 150 which do not require compensation from the compensation scope at runtime. Lazy compensation assumes the use of a compensation scope, such as one of the five compensation scoping strategies described above, but farther reduces the compensation effort by making use of runtime execution state, including input data to the process activities and additional declarations by the workflow designer.

Lazy compensation augments the compensation of process activities by enabling the OpenPM engine 20 (shown in FIG. 5) to avoid the compensation and re-execution of certain work nodes 150 by deferring their compensation and re-execution when re-execution is semantically identical to the original execution. Lazy compensation assumes that most process activities that are compensated will eventually be re-executed and many re-executions are semantically identical to the original execution of those process activities. The five compensation scoping strategies described above enable the OpenPM engine 20, under certain conditions, to avoid the compensation and re-execution of many work nodes 150 statically proven as not being affected by the end compensation point. By contrast, not all work nodes 150 that are statically affected by the end compensation point, such as via data or structural dependencies, necessarily imply the need for compensation.

Some work nodes 150 falling within a given compensation scope are affected by the re-execution of the end compensation point and the associated compensation scope can include work nodes 150 that do not need to be compensated. For instance, dependencies among the work nodes 150 identified at specification time might not occur during actual process executions. Also, the process designers might have chosen a scoping strategy that is more generalized than actually needed. Finally, even if a work node 150 reads data, either directly or indirectly, from the end compensation point, the data values might be the same during re-execution as during the original execution, thereby making re-execution redundant.

Referring back to the example process definition diagram for the SDH network configuration management process 149 of FIG. 8, consider work nodes $wn_3$ (154), $wn_4$ (156) and $wn_5$ (159). Work node $wn_3$ (154) depends on work node $wn_4$ (156) as it has to use the ports of the end ADMs that can be cross connected to the ports of the same end ADMs chosen by work node $wn_4$ (156). Work node 150 $wn_5$ (159) also depends on work node $wn_4$ (156) as it must configure the route selected by $wn_4$ (156). Assuming work node $wn_3$ (154) follows work node $wn_4$ (156) but precedes work node $wn_5$ (159) in execution and work node $wn_5$ (159) fails. In other words, the process has found a route between the two ADMs, established connections between the end points to the selected at the end ADMs, but the application that configures the route failed. Thus, process execution should be rolled back to $wn_4$ (156) to compensate for the problem and be re-executed. Since there are many different routes between two given ports of the two end ADMs, it is likely work node $wn_4$ (156) will find a different route between the same ports. Thus, work nodes $wn_4$ (156) and $wn_5$ (159) need compensation and re-execution. Work node $wn_3$ (154), on the other hand, may or may not need compensation, depending on the runtime execution state, that is, the ADM ports selected by work node $wn_4$ (156).

However, work node $wn_3$ (154) depends on work node $wn_4$ (156) via a data dependency regarding the ADM ports. According to the compensation scoping strategies and acceptable process executions as defined above, work node $wn_3$ (154) must always be compensated. Using lazy compensation, though, allows the re-execution of work node $wn_3$ (154) to be deferred until re-execution time at which time the OpenPM engine 20 can determine if work node $wn_3$ (154) really needs compensation by looking at its input data, that is, the ADM ports selected by work node $wn_4$ (156). The following executions show the lazy compensation of work node $wn_3$ (154) where d3 represents deferred compensation of $wn_3$ (154).

E8: t1, t2, t4, t3, t5, c5, d3, c4, t4, t3, t5, t6.

E9: t1, t2, t4, t3, t5, c5, d3, c4, t4, c3, t3, t5, t6.

In execution E8, the re-execution of work node $wn_4$ (156) selects the same ADM ports which means work node $wn_3$ (154) need not be compensated, as it will produce semantically equivalent data, or exactly the same output data if work node $wn_4$ (156) is deterministic. In execution E9, however, the re-execution of work node $wn_4$ (156) has selected different ADM ports which means work node $wn_3$ (154) must be compensated and re-executed. The execution E8 can result in substantially less work being performed by the process.

Lazy Compensation Group

Acceptable compensation should be complete and order preserving for two reasons. First, a process activity can directly affect or be affected by other process activities of the same workflow process 149 according to the order in which each process activity is executed. Second, a compensation activity might be nondeterministic in its execution and therefore would produce different results on different executions, even if the input data is the same. Consequently, it is critical to ensure acceptable process executions by performing compensation in the exact reverse order as the original execution.

However, correct process executions can also be assured if the process designer can make strong statements about the process and compensation activities at specification time. For example, assume a work node 150 is isolated such that: (1) the work node 150 does not affect nor is affected by other activities; (2) the compensation activity of the work node 150 is deterministic; and (3) the compensation activity of the work node 150 represents a true inverse of the corresponding process activity. Consequently, compensation can be deferred until re-execution time and at re-execution time, the OpenPM engine 20 determines if compensation and re-execution are necessary by comparing the original and current execution states. This technique is applied to the further embodiment of the present invention using lazy compensation.

The OpenPM engine 20 maintains two execution states for each work node 150: (1) a pre image stores the portion of the process relevant data provided to the work node 150; and (2) a post image stores the portion of the process relevant data generated by the work node 150. As shown below with reference to FIG. 16, if the pre image at re-execution time is the same as the pre image from the original execution (block 264), compensation is not necessary and can therefore be avoided for the following two reasons. First, whether the work node 150 is compensated has no effect on other work nodes 150, as the work node 150 is isolated. Second, since the compensation activity is deterministic and a true inverse of the corresponding process activity and because the two pre images are the same, compensation and re-execution guarantee a semantically acceptable post image will be produced.

Many process activities interact with each other, often in a clustered manner. Specifically, a cluster of work nodes 150 are a set of work nodes 150 which interact only with each other. For example, referring back to FIG. 8, work nodes $wn_4$ (156), $wn_5$ (159) and $wn_6$ (161) interact with each other by sharing the same route configuration data that is stored in an application database. However, the other activities, and therefore their corresponding work nodes 150, do not need to access the route configuration data. In such a case, these work nodes $wn_4$ (156), $wn_5$ (159) and $wn_6$ (161) can be grouped into a lazy compensation group (LCG).

Each LCG is a set of work nodes 150 in a process specification having the following properties:

(1) All activities in the LCG have no interactions with activities outside the LCG except through input/output data, that is, process relevant data visible to the OpenPM engine 20 (shown in FIG. 5); and (2) All compensation activities in the LCG must guarantee their original input state will be restored upon compensation. Each compensation activity must be deterministic and the true inverse of the corresponding process activity with respect to its input/output data. However, a compensation activity may store additional non-inverted data into an outside application database accessible only by members of this LCG, such as the business database 94a (shown in FIG. 5).

Each LCG should be chosen with a cardinality that is as small as possible. Preferably, the subset of work nodes 150 participating in each LCG are partitioned to eliminate unnecessary compensation. An LCG can also consist of just one work node 150 which means the work node 150 does not depend on other work nodes 150 via application-specific data. Consequently, the node 150 might not need compensation if its input process-relevant data is the same as the input process relevant data used during its original execution.

Referring back to the example process definition diagram for the SDH network configuration management process 149 of FIG. 8, suppose work nodes $wn_4$ (156), $wn_5$ (159) and $wn_6$ (161) of process P0 form an LCG. The only outside interaction between these nodes is with $wn_3$ (154) but only with process relevant data for specifying selected ports of the end ADMs. The compensation activity of work node $wn_5$ (159) disconnects the ADM cross connections corresponding to the route. This compensation activity can be implemented as a deterministic, true inverse of the process activity for forming a cross connection. Similarly, work node $wn_3$ (154) can form an LCG of its own and can be compensated using lazy compensation. Specifically, its compensation activity can be deferred until re-execution time without affecting other work nodes.

In the described embodiment, lazy compensation groups share several characteristics. First, process activities are free to apply non-deterministic behavior. Only compensation activities are constrained to act as a true inverse with regard to process relevant data. Moreover, all activities need not fall into an LCG and an LCG can contain only one member. Second, the undeferral and compensation of process activities in each LCG must be performed in the reverse order of the completion of their original executions. This requirement ensures these activities do not interact outside of their LCG while allowing internal interaction, such as by sharing the same application database. Conversely, the process activities not in an LCG are not constrained to act as true inverses of their corresponding process activities. Thus, the compensation of a process activity not contained in an LCG can force the delayed compensation of all of the deferred activities in each LCG containing a member compensated after this process activity. Third, each LCG can be formed in several ways. In general, the smaller the cardinality of each LCG, the greater the opportunity for compensation optimization. Preferably, each LCG should be chosen with a cardinality as small as possible and partitioned into a subset of work nodes 150 to eliminate as much unnecessary compensation as possible.

Lazy Compensation Procedures

Referring back to FIG. 15, an ordered list $LCG_i$.deferredList is maintained for storing the compensations deferred within each LCG. Briefly, during runtime compensation, one of three actions is performed for each work node $WN_X$ 150:

(1) If $WN_X$ is not in any LCG, immediate compensation (block 246).

(2) If $WN_X$ is in an LCG and the execution state (current post image) is the same as that of the original execution (original post image), deferring compensation (blocks 247–248). Generally, compensation is not needed if the pre image remains the same during re-execution as during the original execution. Since the compensation activity is a true inverse, the OpenPM engine 20 maps the post image to the pre image.

(3) If the post images are different, group compensation (blocks 250–251). Different post images imply possibly different pre images. Compensation, therefore, cannot be deferred and re-execution is necessary, in part, to produce the new post image. At this point, not only does the current work node 150, but also the deferred work nodes 150 in the same LCG must be compensated since they all interact with the current work node 150.

The steps for performing lazy compensation will now be described. First, the current post image is computed (block 240). The original post image and pre image are both looked up (blocks 241 and 242, respectively). Each $LCG_i$ is iteratively selected (block 243). If work node $WN_X$ 150 is not an element of the currently selected $LCG_i$ (block 243), the work node $WN_X$ 150 is compensated normally (block 246). Otherwise, if work node $WN_X$ 150 is an element of the currently selected $LCG_i$ (block 243), $LCG_i$ is set to the LCG in which the work node $WN_X$ 150 resides (block 244). If the current post image equals the original post image (block 245), the work node $WN_X$ 150 is added to the end of the $LCG_i$ deferred list of deferrals (block 247) and the process data from the original pre image is updated (block 248). Otherwise, if the current post image does not equal the original post image (block 245), each element work node $WN_Y$ 150 in the $LCG_i$ deferred list is iteratively selected in order (block 249) and the following two steps performed. First, the work node $WN_Y$ 150 is compensated normally (block 250). Next, the work node $WN_Y$ 150 is popped from the $LCG_i$ deferred list (block 251).

Figure 16:
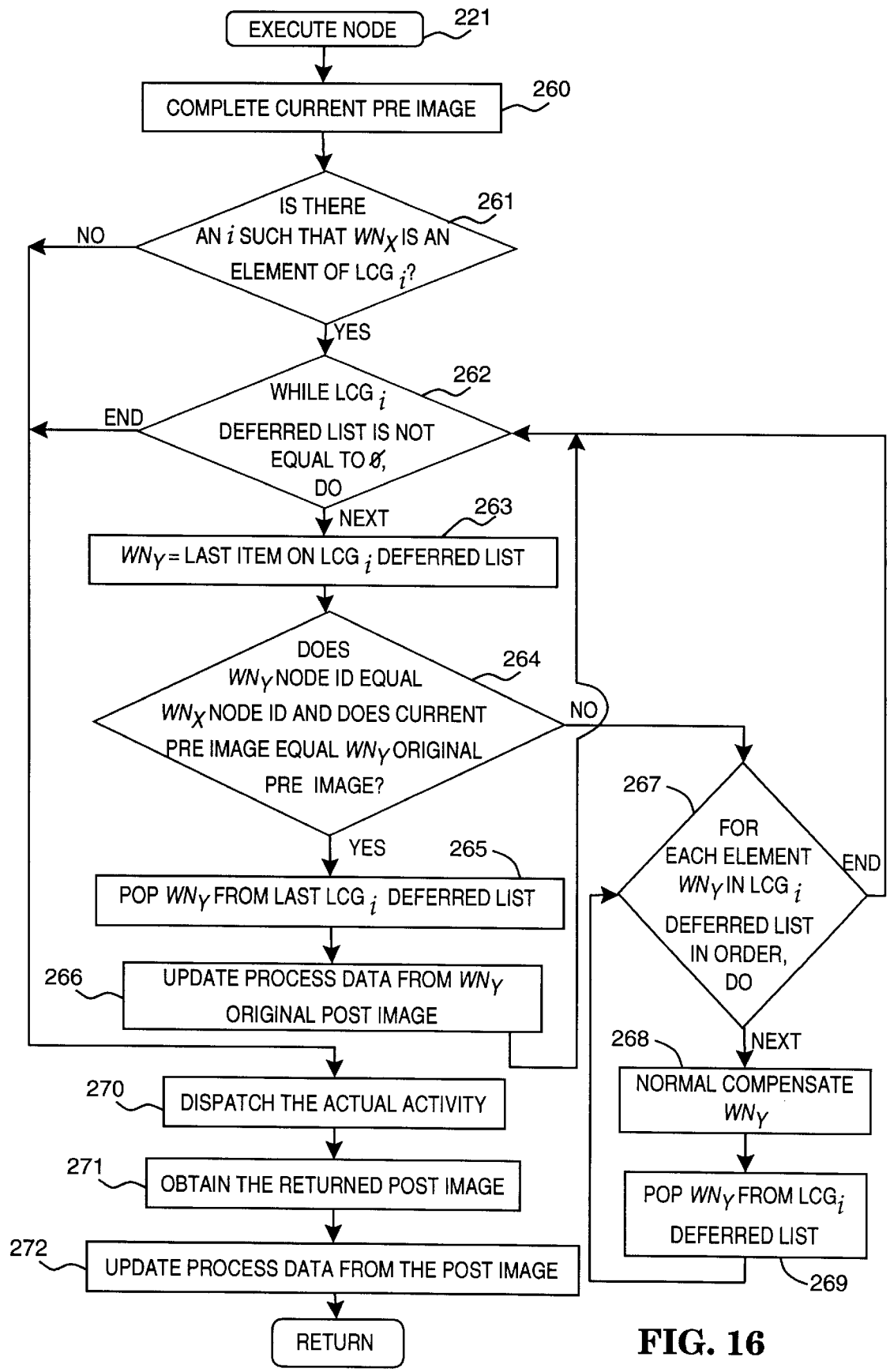
FIG. 16 is a flow diagram of a further embodiment of the present invention for performing node re-execution during lazy compensation in the routine of FIG. 13.

FIG. 16 is a flow diagram of a further embodiment of the present invention for performing node re-execution during lazy compensation in the routine of FIG. 13.

Briefly, the execution of a work node $WN_X$ 150 is modified in two ways to support lazy compensation. First, separate actions are required for executing a work node $WN_X$ 150 which belongs to an LCG that has compensations queued for deferral. Second, if the work node $WN_X$ 150 is at the end of the deferred queue, that is, the node was the least recently deferred compensation in that LCG not undeferred or rendered useful, and was originally run with the same pre image, the node can be popped from the deferred queue item and rendered useful. However, if the node is not at the end of the deferred queue or if the pre images do not match, the node must be undeferred and all items remaining in the deferred queue must be compensated prior to executing the node in the normal way.

The steps for performing lazy compensation re-execution will now be described. First, the current pre image is completed (block 260). If an index i is found such that the work node $WN_X$ 150 is an element of $LCG_i$ (block 261), an outer iterative loop (blocks 262–269) is performed while the $LCG_i$ deferred list is not equal to the empty list (block 262). Thus, a work node $WN_Y$ 150 is set to the last item on the $LCG_i$ deferred list (block 263). If the node identifier for the work node $WN_Y$ 150 does not equal the node identifier for the work node $WN_X$ 150 or the current pre image does not equal the original pre image for the work node $WN_Y$ 150 (block 264), an inner iterative loop (blocks 267–269) is performed for each element $WN_Y$ 150 in the deferred list for the $LCG_i$ in order (block 267). First, the work node $WN_Y$ 150 is compensated normally (block 268). Next, the next work node $WN_Y$ 150 is popped from the deferred list for the $LCG_i$ (block 269). If the node identifier for the work node $WN_Y$ 150 equals the node identifier for the work node $WN_X$ 150 and the current pre image equals the original pre image for the work node $WN_Y$ 150 (block 264), the outer iterative loop is exited and the following five steps are performed. First, the next work node $WN_Y$ 150 is popped from the deferred list for the $LCG_i$ (block 265). The process data from the original post image for the work node $WN_Y$ 150 is updated (block 266). The actual activity is dispatched (block 270) and the returned post image is obtained (block 271). Finally, the process data from the post image is updated (block 272). Also, if an index i is not found such that the work node $WN_X$ 150 is an element of $LCG_i$ (block 261), the preceding three steps (blocks 270–272) are performed.

Not all deferred compensations results in savings. Deferred compensations may be cancelled for the following four reasons:

(1) During compensation, the compensation of some process activity not contained in an LCG might not restore the output parameters for some other process activity that is contained in an LCG. In this situation, all deferred compensations in that LCG must be undeferred and compensated (blocks 249–251 of FIG. 15).

(2) During re-execution, a process activity contained in an LCG might need to be re-executed if its inputs no longer match those inputs provided during the initial execution whose compensation was deferred. In this situation, all deferred compensations in that LCG must be undeferred and compensated (blocks 267–269 of FIG. 16).

(3) During re-execution, a process activity contained in an LCG might execute another process activity in an LCG which does not have a deferred compensation, yet in the LCG itself contains other process activities that contain deferred compensations. In this situation, all remaining deferred compensations in that LCG must be undeferred and compensated (blocks 267–269 of FIG. 16).

(4) As the process completes, the OpenPM engine 20 might find that some deferred compensations have not yet been re-executed. These deferred compensations must be undeferred and compensated using the terminate process instance routine as further described below with reference to FIG. 17.

In addition, a work node 150 whose compensation is deferred may not be re-executed at all if it occurs on a branch of a process activity not taken during re-execution. In such cases, the deferral must be canceled and the process activity compensated when the OpenPM engine 20 determines that the process activity will not be re-executed. The cancellation and compensation can be performed just prior to the process termination or when any process activity also contained in the same LCG runs a non-deferred forward execution.

Figure 17:
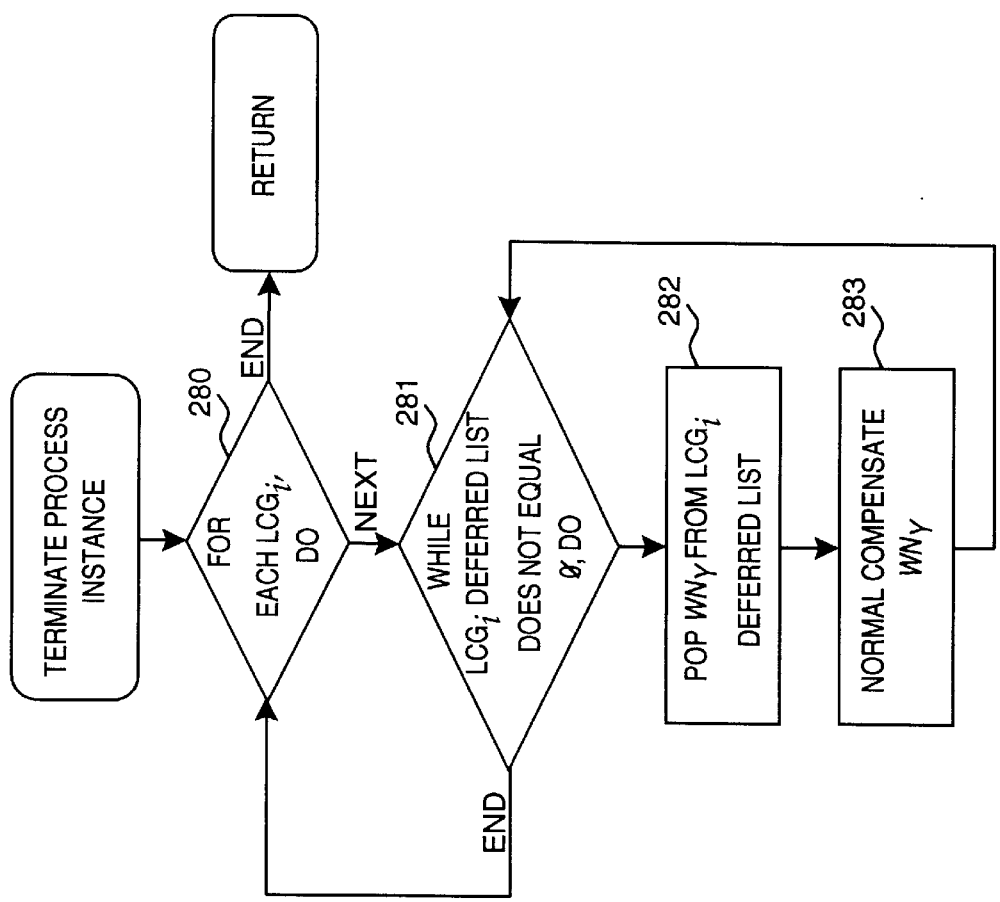
FIG. 17 is a flow diagram of a routine for terminating a process instance in the routine of FIG. 13.

FIG. 17 is a flow diagram of a routine for terminating a process instance in the routine of FIG. 13. Its purpose is to undefer and compensate process activities that should have been re-executed but were not. Each $LCG_i$ is iteratively selected (block 280). While the $LCG_i$ deferred list is not equal to the empty list (block 281), the next work node $WN_Y$ 150 is popped from the deferred list for the $LCG_i$ (block 282) and the work node $WN_Y$ 150 is compensated normally (block 283).

Having described and illustrated the principles of the invention in a preferred embodiment thereof, it should be apparent that the invention can be modified in arrangement and detail without departing from such principles. We claim all modifications and variations coming within the spirit and scope of the following claims.

We claim:

1. A method for performing selective compensation of a failed process activity in a distributed workflow management system, the distributed workflow management system operating over the computer network comprising a plurality of interconnected computers, each computer including a processor, memory and input/output facilities, the method comprising the steps of:

defining a process definition diagram comprising computer-readable instructions stored in the memory of at least one of the computers and containing a role specification of process activities for performing a workflow process, at least one of the process activities being formed into a lazy compensation group;

mapping the role specification of process activities using a resource manager to at least one of the resources at runtime;

executing each process activity with the mapped resource using a workflow process engine, including forming a pre image storing a portion of process relevant data provided to the process activity and a post image storing a portion of process relevant data generated by the process activity;

compensating the failed process activity for at least one such process activity preceding the failed process activity if the at least one such process activity is not in the lazy compensation group responsive to the process definition diagram; and re-executing at least one further such process activity with the mapped resource using a workflow process engine if the at least one further such process activity is in the lazy compensation group responsive to the process definition diagram.

2. A method according to claim 1, wherein the step of compensating the failed process activity further comprises the step of comparing a current post image for a latest execution of the at least one further such process activity to an original post image for a first execution of the at least one further such process activity.

3. A method according to claim 2, further comprising the step of deferring the step of compensating for the at least one further such process activity if the current post image is the same as the original post image.

4. A method according to claim 3, wherein another such process activity contained in the lazy compensation group of the at least one such further process activity generates output parameters, the method further comprising the step of cancelling the step of deferring if the output parameters for the another such process activity are not restored during the step of compensating.

5. A method according to claim 4, further comprising the step of compensating each of the process activities contained in the lazy compensation group of the at least one further such process activity.

6. A method according to claim 4, further comprising the step of compensating each of the process activities contained in the lazy compensation group of the at least one further such process activity.

7. A method according to claim 3, wherein another such process activity contained in the lazy compensation group of the at least one such further process activity receives input parameters, the method further comprising the step of cancelling the step of deferring if the input parameters for the another such process activity during re-execution do not match the input parameters for the another such process activity during original execution.

8. A method according to claim 2, further comprising the step of compensating each of the process activities contained in the lazy compensation group of the at least one further such process activity.

9. A method according to claim 3, wherein another such process activity contained in the lazy compensation group of the at least one such further process activity is executed by the one such further process activity, the method further comprising the step of cancelling the step of deferring if the lazy compensation group of the at least one such further process activity contains other process activities having a deferred compensation.

10. A method according to claim 2, further comprising the step of deferring the step of compensating each of the process activities contained in the lazy compensation group of the at least one further such process activity if the current post image is not the same as the original post image.

11. A method according to claim 2, further comprising the steps of:
cancelling the step of deferring if the lazy compensation group of the at least one such further process activity contains other process activities that have not been re-executed; and
compensating each of the other process activities contained in the lazy compensation group of the at least one further such process activity.

12. A method using a workflow process engine for flexibly compensating a workflow process in a distributed workflow management system, the distributed workflow management system comprising a computer network including a plurality of interconnected computers operatively coupled to a plurality of resources, each computer including a processor, memory and input/output facilities, the method comprising the steps of:
operating the workflow process engine on at least one of the computers, the workflow process comprising a sequence of the process activities represented by a process definition diagram stored in the memory of the computer;
controlling the execution of the workflow process responsive to the process definition diagram on each of the computers using the workflow process engine, including the steps of:
performing a forward activity for performing each process activity in the workflow process using one of the resources;
performing a cancel activity for cancelling such a process activity in the workflow process responsive to a cancel request; and
performing a compensation activity for compensating such a process activity in the workflow process that has failed.

13. A method according to claim 12, further comprising the step of specifying a compensation scope comprising the process activities in the process definition diagram already performed prior to the failed process activity.

14. A method according to claim 13, wherein the step of specifying a compensation scope further comprises the steps of:
designating a start compensation point corresponding to the node in the process definition diagram associated with the failed process activity;
designating an end compensation point corresponding to a node in the process definition diagram associated with such a process activity already performed prior to the failed process activity; and
selecting a scoping strategy for compensation.

15. A method according to claim 14, wherein the step of designating an end compensation point further comprises the step of selecting a specific save point using a name associated with the node in the process definition diagram associated with such a process activity already performed prior to the failed process activity.

16. A method according to claim 14, wherein the workflow process engine further comprises a system log file storing statuses of the process activities, the step of designating an end compensation point further comprises the step of searching the system log file for a last executed save point.

17. A method according to claim 14, wherein the step of designating an end compensation point further comprises the step of following arcs in the process definition diagram from the node in the process definition diagram associated with the failed process activity to a last predecessor save point.

18. A method according to claim 12, further comprising the steps of:
determining application-specific data for the failed process activity;
determining process-relevant data for the failed process activity; and
defining a minimal compensation scope as the compensation scope comprising the process activities in the process definition diagram depending upon the application-specific data or the process-relevant data.

19. A method according to claim 12, further comprising the steps of:
maintaining a system log file in the memory of at least one of the computers using the workflow process engine to store a history of statuses for the process activities; and
defining a temporal-based compensation scope as the compensation scope comprising the process activities in the system log file completed prior to the failed process activity.

20. A method according to claim 12, further comprising the steps of:
determining data for the failed process activity dependent upon execution of prior process activities;
determining process-specific data for the failed process activity;
determining process-relevant data for the failed process activity; and
defining a computable compensation scope as the compensation scope comprising the process activities in the process definition diagram depending upon the execution data, the process-specific data or the process-relevant data.

21. A method according to claim 12, further comprising the steps of:
maintaining a system log file in the memory of at least one of the computers using the workflow process engine to store a history of statuses for the process activities;
identifying the process activities in the process definition diagram reachable from another process activity; and
defining a structural-based compensation scope as the compensation scope by removing the reachable process activities in the process definition diagram not yet started based on the system log file.

22. A method according to claim 12, comprising the steps of:
identifying the process activities in the process definition diagram reachable from another process activity;
determining process-specific data for the failed process activity;
determining process-relevant data for the failed process activity; and
defining an extended compensation scope as the compensation scope comprising the reachable process activities in the process definition diagram and the process activities in the process definition diagram depending upon the process-specific data or the process-relevant data.

23. A method for performing lazy compensation in a distributed workflow management system, the distributed workflow management system operating over a computer network comprising a plurality of interconnected computers, each computer including a processor, memory and input/output facilities, the method comprising the steps of:

defining a process definition diagram comprising computer-readable instructions stored in the memory of at least one of the computers and containing a role specification of process activities for performing a workflow process;

mapping the role specification of process activities using a resource manager to at least one of the resources at runtime;

forming at least one lazy compensation group comprising at least one of the process activities which interacts with only those of the process activities within the at least one lazy compensation group and with only those of the process activities outside the at least one lazy compensation group via process relevant data and whose original input state is restored upon compensation;

executing each process activity with the mapped resource using a workflow process engine, including forming an original pre image of each such process activity before execution and an original post image of each such process activity after execution; and compensating each such process activity that fails responsive to the process definition diagram by re-executing at least one of the process activities preceding the failed process activity.

24. A method according to claim 23, the step of compensating each such process activity further comprising the step performing lazy compensation for each such process activity in each such lazy compensation group, comprising the steps of:

forming a current post image of each such process activity in the lazy compensation group;

comparing the current post image for the process activity to the original post image for the process activity;

adding the process activity to a list of deferrals and updating process data for the process activity using the original pre image if the current post image for the process activity matches the original post image for the process activity; and performing the step of compensating each such process activity in the list of deferrals if the current post image for the process activity does not match the original post image for the process activity.

25. A method according to claim 24, further comprising the step of performing extended re-execution of the at least one of the process activities preceding the failed process activity, comprising the steps of:

forming a current pre image of each such process activity in the lazy compensation group;

comparing the current pre image for the process activity to the original pre image for the process activity;

removing the process activity from the list of deferrals and updating the process data for the process activity using the original pre image if the current pre image for the process activity matches the original pre image for the process activity; and performing the step of compensating each such process activity in the list of deferrals if the current pre image for the process activity does not match the original pre image for the process activity.

26. A method according to claim 25, further comprising the step of terminating the process activity, further comprising the step of performing the step of compensating each such process activity remaining in the list of deferrals.

27. A method for performing flexible compensation of a failed process activity in a distributed workflow management system, the distributed workflow management system operating over the computer network comprising a plurality of interconnected computers, each computer including a processor, memory and input/output facilities, the method comprising the steps of:

defining a process definition diagram comprising computer-readable instructions stored in the memory of at least one of the computers and containing a role specification of process activities for performing a workflow process;

mapping the role specification of process activities using a resource manager to at least one of the resources at runtime; and executing each process activity with the mapped resource using a workflow process engine; and compensating the failed process activity responsive to the process definition diagram by re-executing at least one of the process activities preceding the failed process activity.

28. A method according to claim 27, wherein the failed process activity comprises one such process activity which has failed or timed out, the step of compensating the failed process activity further comprising the steps of:

determining whether the role specification for the failed process activity requires compensation;

suspending the step of executing each process activity for all other such process activities which are currently active;

computing an end compensation point for the failed process activity;

computing a compensation scope for the failed process activity beginning from the end compensation point;

cancelling each such process activity associated with a node falling within the compensation scope and removing each associated process activity from the compensation scope;

repeating the step of compensating the failed process activity for each node falling within the compensation scope.

29. A method according to claim 28, further comprising the steps of:

designating the end compensation point as a new start compensation point upon a failure of the end compensation point; and repeating the step of compensating for each node falling within the compensation scope the failed end compensation point.

30. A method according to claim 27, further comprising the steps of:

placing at least one of the process activities preceding the failed process activity into a compensation queue; and deferring the re-execution of the at least one of the process activities if input data to the preceding process activity during the re-execution is substantially identical to input data during the step of executing each process activity.

31. A system for performing flexible workflow process compensation in a distributed workflow management system, comprising:

a computer network comprising a plurality of interconnected computers, each computer including a processor, memory and input/output facilities, the distributed workflow management system operating over the computer network;

a plurality of resources upon which the workflow process is performed, each resource being operatively coupled to at least one of the computers;

a process definition diagram comprising computer-readable instructions stored in the memory of at least one of the computers and containing a role specification of process activities for performing the workflow process;

a resource manager mapping the role specification of process activities to at least one of the resources at runtime; and a workflow process engine executing each process activity using the mapped resource and compensating a failed process activity responsive to the process definition diagram.

32. A system according to claim 31, wherein the process definition diagram comprises a set of work nodes and rule nodes interconnected by unidirectional arcs, each work node being associated with one of the process activities, each rule node being associated with at least one route through the process definition diagram, the workflow process engine evaluating each work node to perform the associated process activity using one of the resources and each rule node to follow the associated at least one route through the process definition diagram.

33. A system according to claim 31, further comprising:

a system log file stored in the memory of at least one of the computers storing a history of statuses for the process activities; and a compensation scope stored in the memory of at least one of the computers, the workflow process engine further compensating the failed process activity by searching the system log file to select completed process activities falling within the compensation scope and compensating and re-executing the selected process activities.

* * * * *